(12) United States Patent
Daoud et al.

(10) Patent No.: US 12,082,046 B2
(45) Date of Patent: Sep. 3, 2024

(54) METHODS AND APPARATUS FOR OPTIMIZING NETWORK ACCESS TO ENHANCE A USER'S EXPERIENCE

(71) Applicant: Charter Communications Operating, LLC, St. Louis, MO (US)

(72) Inventors: Mohamed Daoud, Englewood, CO (US); Hossam Hmimy, Aurora, CO (US); Hany Heikal, Aurora, CO (US); Wael Guibene, Parker, CO (US); Muhammad Khan, Greenwood Village, CO (US); Parmjit Dhillon, Tampa, FL (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 17/111,501

(22) Filed: Dec. 3, 2020

(65) Prior Publication Data

US 2022/0182882 A1     Jun. 9, 2022

(51) Int. Cl.
*H04W 28/086* (2023.01)
*H04W 24/02* (2009.01)
*H04W 28/02* (2009.01)
*H04W 36/14* (2009.01)
*H04W 72/20* (2023.01)
*H04W 84/12* (2009.01)

(52) U.S. Cl.
CPC ....... *H04W 28/0865* (2023.05); *H04W 24/02* (2013.01); *H04W 28/0268* (2013.01); *H04W 36/14* (2013.01); *H04W 72/20* (2023.01); *H04W 84/12* (2013.01)

(58) Field of Classification Search
CPC ............. H04W 28/0819; H04W 24/02; H04W 28/0268; H04W 36/14; H04W 72/0406
See application file for complete search history.

(56) References Cited

U.S. PATENT DOCUMENTS

| | | | |
|---|---|---|---|
| 9,426,728 B2* | 8/2016 | Draznin | H04L 12/5692 |
| 2006/0019679 A1* | 1/2006 | Rappaport | H04W 64/00 455/456.5 |
| 2009/0227274 A1* | 9/2009 | Adler | H04W 8/18 455/70 |

(Continued)

*Primary Examiner* — Mohammad S Anwar
(74) *Attorney, Agent, or Firm* — Straub & Straub; Michael P. Straub; Stephen T. Straub

(57) ABSTRACT

Methods and apparatus for controlling device use of available networks, e.g., cellular and WiFi, are described. End devices report key performance indicator and resource utilization information, e.g., on a per application basis, to a configuration server. The configuration server determines, based on the received information, e.g., using machine learning and/or artificial intelligence, sets of configuration profiles, each configuration profile including one or more set of applications for which an end device should use a particular network. An exemplary configuration profile may identify a first set of applications for which a first network is to be used, e.g., a cellular network such as a P-LTE network, and a second set of applications for which a second network, e.g. a WiFi network, is to be used. The configuration server selects a configuration profile that is best suited for a particular end device and communicates that selected profile to the end device.

27 Claims, 13 Drawing Sheets

(56) References Cited

U.S. PATENT DOCUMENTS

| | | | |
|---|---|---|---|
| 2012/0083270 A1* | 4/2012 | Robbins | H04W 12/08 |
| | | | 455/435.1 |
| 2013/0040683 A1* | 2/2013 | Siomina | H04W 28/0236 |
| | | | 455/517 |
| 2013/0185373 A1* | 7/2013 | Vandwalle | H04W 56/0015 |
| | | | 709/208 |
| 2016/0173297 A1* | 6/2016 | Kanugovi | H04W 76/12 |
| | | | 370/328 |
| 2019/0213115 A1* | 7/2019 | Takawale | G06F 8/30 |
| 2020/0084810 A1* | 3/2020 | Gundavelli | H04W 12/06 |

* cited by examiner

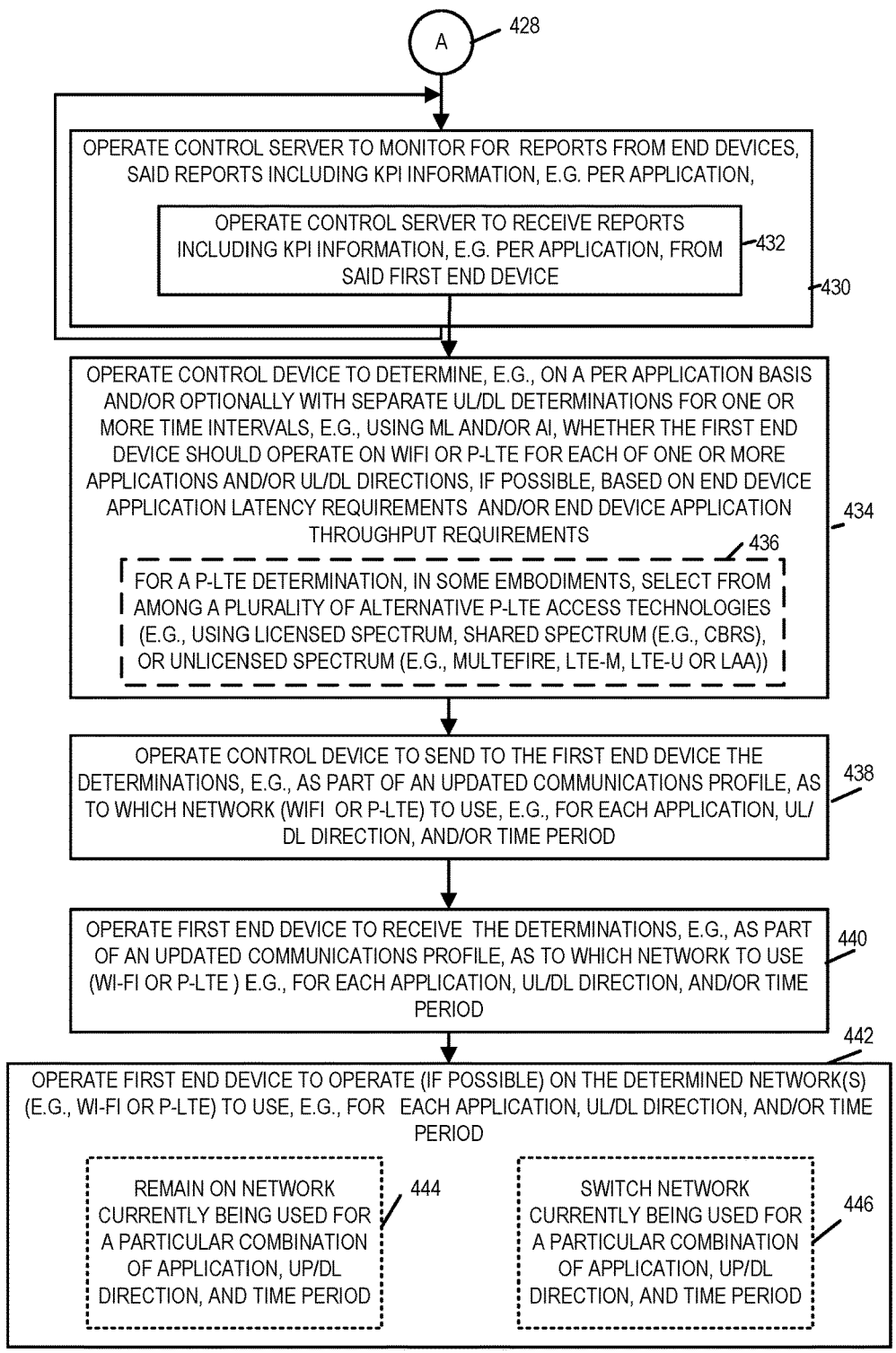

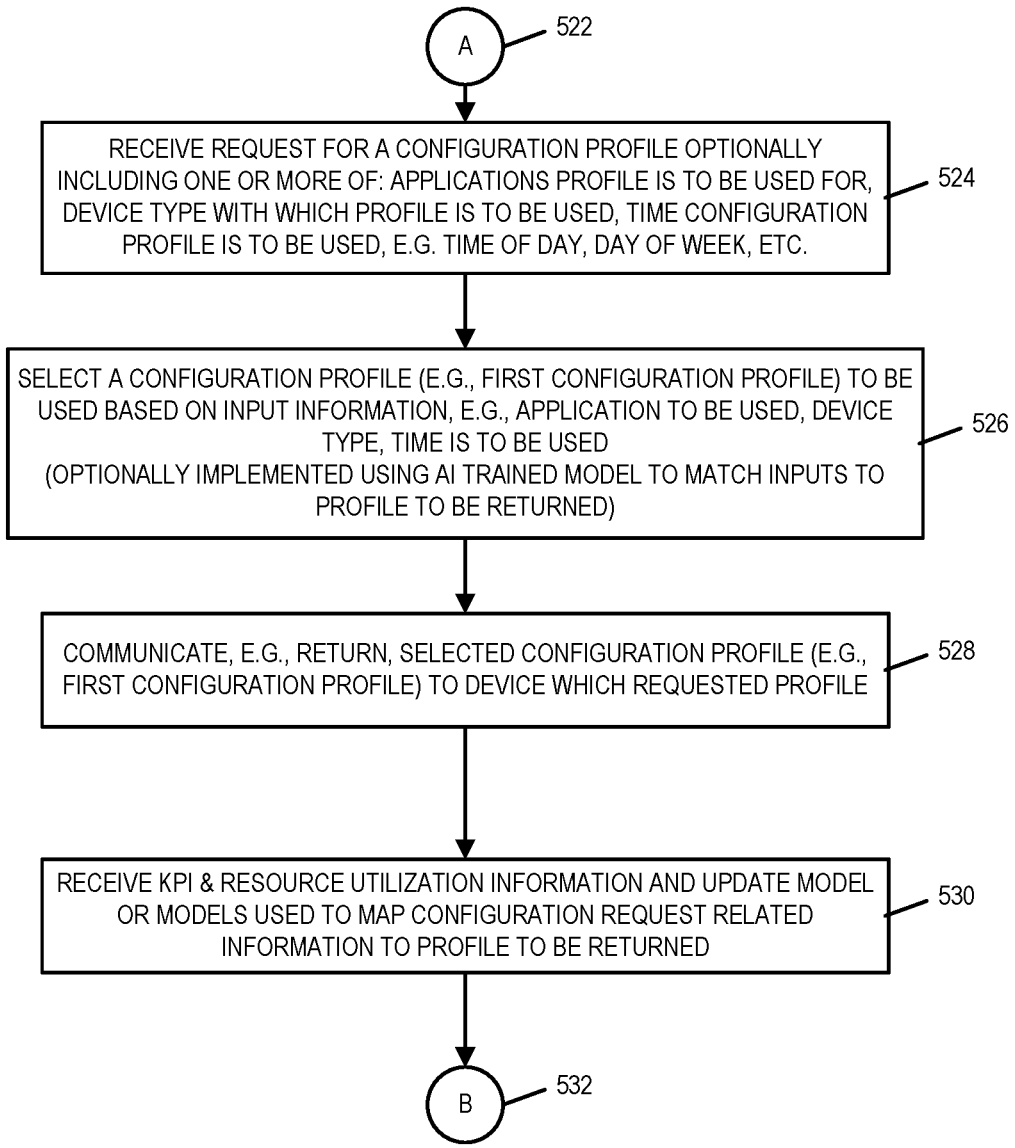

METHODS AND APPARATUS FOR OPTIMIZING NETWORK ACCESS TO ENHANCE A USER'S EXPERIENCE

FIELD

The present application relates to network and/or communications device management and, more particularly, to controlling device use of available networks, e.g., a P-LTE and/or WIFI network, to provide a user a satisfactory communications experience.

BACKGROUND

Private LTE (P-LTE) and WIFI are two access methods that usually co-exist especially in environments that require benefits of both worlds like low latency from P-LTE and big bandwidth with high throughput from WIFI. These environments are usually private enterprises like factories or hospitals where P-LTE is expected to play a big role.

In current approaches, end devices are usually configured to use one of the access method technologies, e.g. with a user of a device controlling which access network is selected at a given time. In some systems if WIFI is turned on and available, the device will use WIFI no matter what application or applications are running on the device and/or what the WIFI coverage looks like in terms of supportable throughput.

FIG. 1 is a drawing illustrating a system 100 including P-LTE access and WiFi access, in which end devices (end device 1 110, . . . end device N 112) will use WIFI no matter what application or applications are running on the end device and/or what the WIFI coverage looks like in terms of supportable throughput, provided WiFi is turned on and available. System 100 includes a P-LTE access device, e.g., a P-LTE base station 102, which has a corresponding P-LTE network coverage area 103. System 100 further includes a plurality of WiFi access point (WiFi AP 1 104, WiFi AP2 106, WiFi AP3 108), each with a corresponding WiFi network coverage area (WiFi network 1 coverage area 105, WiFi network coverage area 2 107, WiFi network coverage area 3 109). System 100 further includes a plurality of end devices (end device 1 110, . . . , end device N 112). At least some of the end devices are mobile devices which may move throughout the system 100. End device 1 110 is currently located within the coverage area 105 of WiFi AP 1 104 and within the coverage area 103 of P-LTE access device 102. End device 1 uses the WiFi network corresponding to WiFi access point 1 104 for access. End device 2 111 is currently located within the coverage area 103 of P-LTE access device 102, but is outside the coverage areas of any of the WiFi networks. End device 2 111 uses the P-LTE network for access and uses P-LTE access device 102 as it point of network attachment. End device N 112 is currently located within the coverage area 109 of WiFi AP 3 108 and within the coverage area 103 of P-LTE access device 102. End device N 112 uses the WiFi network corresponding to WiFi access point 3 108 for access.

FIG. 2 is a drawing of a flowchart 200 of an exemplary access method used by any of the end devices (end device 1 110, end device 2 111, . . . , end device N 112) of system 100 of FIG. 1. Operation starts in step 202 in which the end device is powered on and initiated. Operation proceeds from start step 202 to step 204. In step 204 the end device is operated to join a P-LTE network. Operation proceeds from step 204 to step 206. In step 206 the end device is operated to join a WiFi network. Operation proceeds from step 206 to step 208. In step 208 the end device determines if WiFi is turned on, e.g., activated by the user of the end device, on the end device. If the determination of step 208 is that WiFi is not on, then operation proceeds from step 208 to step 212, in which the end device is operated to stay on the P-LTE network and use the P-LTE network for communications, e.g. communications corresponding to applications. However, if the determination of step 208 is that WiFi is on, then operation proceeds from step 208 to step 210. In step 210 the end device determines if there is good WiFi coverage, e.g. is the received signal strength from a WiFi access point above a predetermined threshold. If the determination of step 210 is that there is not good WiFi coverage, then operation proceeds from step 210 to step 212, in which the end device is operated to stay on the P-LTE network and use the P-LTE network for communications, e.g. communications corresponding to applications. However, if the determination of step 210 is that there is good WiFi coverage, then operation proceeds from step 210 to step 214, in which the end device is operated to stay on the WiFi network and use the WiFi network for communications, e.g. communications corresponding to applications.

Operation proceeds from step 212 to the input of step 208, e.g. after a predetermined time interval, to re-check if the WiFi on the end device is on. Alternatively, operation proceeds from step 214 to the input of step 210, e.g. after a predetermined time interval, to re-check the quality of the WiFi channel at the current location of the end device.

It would be desirable if rather than be limited to user control of whether WIFI or LTE were used or defaulting to WIFI when WIFI was enabled, informed decisions could be made on a per application basis, network conditions and/or per user basis whether P-LTE or WIFI is used when both are available. While not necessary for all embodiments, it would be desirable if in some embodiments different networks could be used for uplink and/or downlink. In addition, it would be desirable if network selection could be made in an automated manner in at least some cases without need for user involvement.

In view of the above, it should be appreciated that there is a need for new and/or improved methods of determining which access network is used by a user and/or application and/or for determining whether the same or different access networks should be used for uplink and/or downlink traffic.

SUMMARY

Methods and apparatus for controlling device use of available networks, e.g., cellular and WiFi networks which at least partially overlap, are described. End devices report key performance indicator information and resource utilization information, e.g., on a per application basis, to a configuration server. The configuration server determines, based on the received information, e.g., using machine learning and/or artificial intelligence in some embodiments, sets of configuration profiles, each configuration profile including one or more set of applications for which an end device should use a particular network. An exemplary configuration profile may identify a first set of applications for which a first network is to be used, e.g., a cellular network such as a private LTE network, and a second set of applications for which a second network, e.g. a WiFi network, is to be used. In some embodiments, different network may be, and sometimes are, selected for the same application, e.g. a first network is selected and identified to be used for UL communications with regard to the application and a second network is selected and identified to be used for downlink communications with regard to the application. The configuration server selects a configuration profile that is best suited for a particular end device, which is running a particular set of applications at a particular time, and communicates that selected profile to the end device, which implements access in accordance with the received configuration profile.

An exemplary method of operating a configuration server in a communications network, in accordance with some embodiments, comprises: storing configuration profiles for one or more communications devices, said configuration profiles including a first configuration profile for a first device, said first configuration profile indicating a first set of applications for which a WIFI network is to be used and a second set of applications for which a cellular (P-LTE) network is to be used; receiving a request for a configuration profile from the first communications device; and sending the communications profile to the first communications device to control use of said cellular and said WIFI networks in accordance with the first communications protocol.

While various features discussed in the summary are used in some embodiments it should be appreciated that not all features are required or necessary for all embodiments and the mention of features in the summary should in no way be interpreted as implying that the feature is necessary or critical for all embodiments.

Numerous variations on the above described methods and apparatus are described in the detailed description which follows.

BRIEF DESCRIPTION OF THE FIGURES

FIG. 4B is a second part of a flowchart of an exemplary method of operating a communications system in accordance with an exemplary embodiment.

FIG. 4 comprises the combination of FIG. 4A and FIG. 4B.

FIG. 5B is a second part of a flowchart of an exemplary method of operating a control server, e.g. a configuration server, in accordance with an exemplary embodiment.

FIG. 5 comprising the combination of FIG. 5A and FIG. 5B.

DETAILED DESCRIPTION

Figure 1:
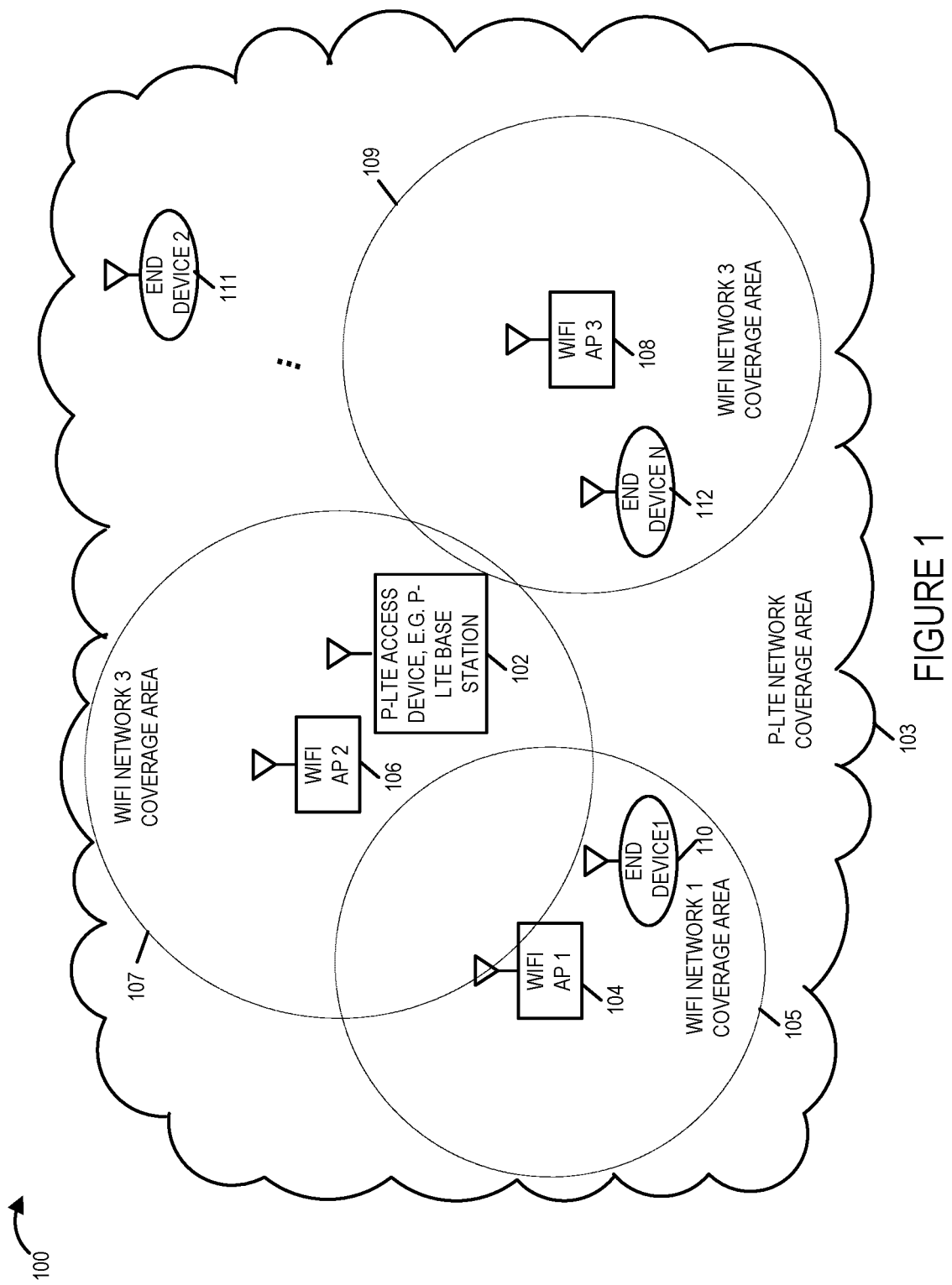
FIG. 1 is a drawing illustrating a system including P-LTE access and WiFi access, in which end devices will use WIFI no matter what application or applications are running on the end device and/or what the WIFI coverage looks like in terms of supportable throughput, provided WiFi is turned on and available.
Figure 2:
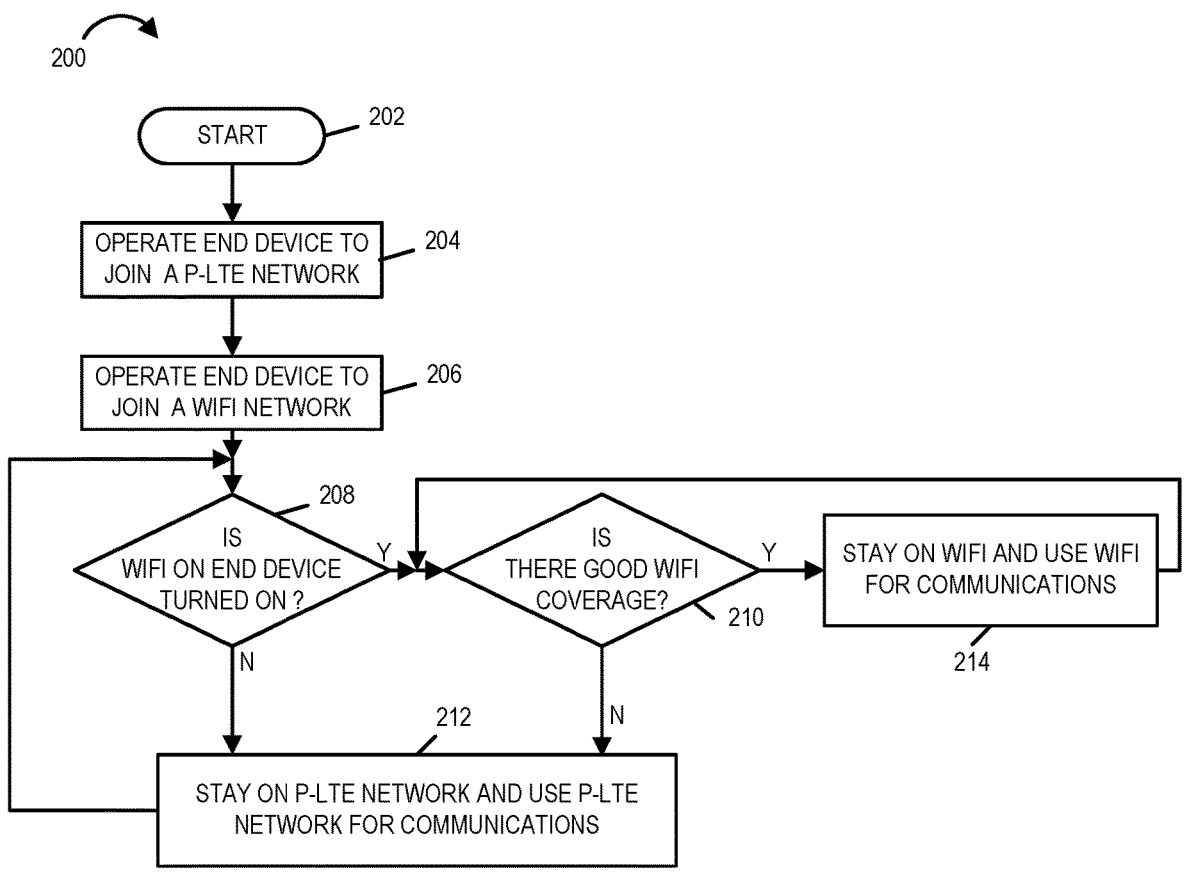
FIG. 2 is a drawing of a flowchart of an exemplary access method used by any of the end devices of system of FIG. 1.
Figure 3:
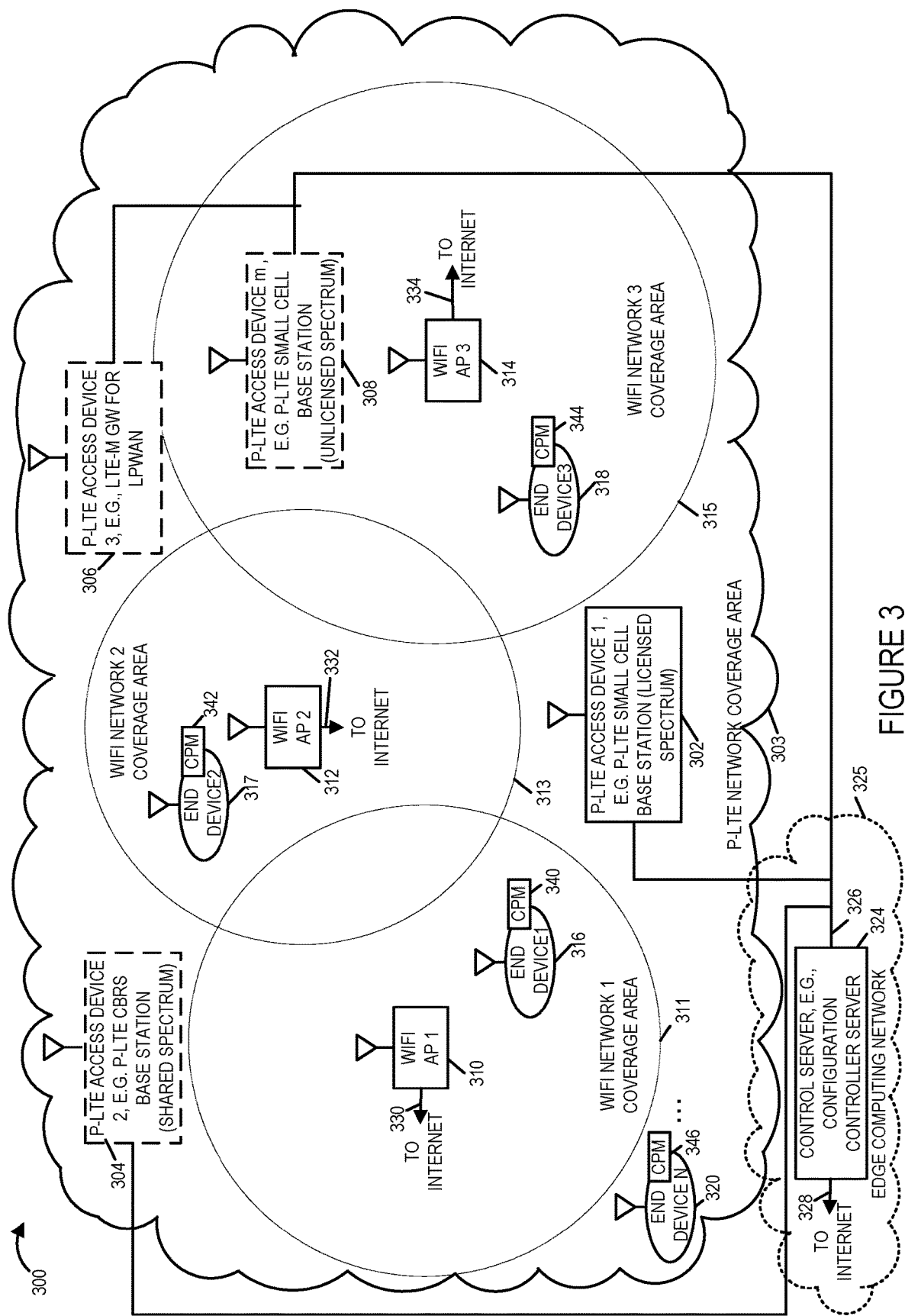
FIG. 3 is a drawing of an exemplary communications system including P-LTE access and WiFi access in accordance with an exemplary embodiment.

FIG. 3 is a drawing of an exemplary communications system 300 in accordance with an exemplary embodiment. Exemplary communications system 300 includes a private cellular network, e.g., a private LTE (P-LTE) network, a plurality of WiFi networks, and an edge computing network 325. P-LTE is used as an example of a private cellular network but other types of private cellular networks could be, and sometimes are, used rather than P-LTE. The P-LTE network has a corresponding P-LTE network wireless coverage area 303 and includes one or more P-LTE access devices (P-LTE access device 1 302, e.g., a P-LTE small cell base station using licensed spectrum, P-LTE access device 2 304, e.g., a P-LTE Citizens Broadband Radio Services (CBRS) base station using shared spectrum, P-LTE access device 3, e.g., a LTE-M gateway (GW) for a low power wide area network (LPWAN), . . . , P-LTE access device m, e.g., a P-LTE small cell base station using unlicensed spectrum. In some embodiments, each of the alternative P-LTE access devices (302, 304, 306, . . . 308) provides coverage throughout P-LTE network coverage area 303. In some other embodiments, some of the alternative P-LTE access devices provide coverage within a portion of the P-LTE network coverage area 303, with the combination of alternative P-LTE access devices (302, 304, 306, . . . 308) providing coverage for entire P-LTE network coverage area 303. In some embodiments, a set of P-LTE access devices using the same access technology in combination provides coverage for P-LTE coverage area, e.g. a set of P-LTE access devices which are base stations using licensed spectrum, a set of P-LTE access devices which are base stations using unlicensed spectrum, a set of P-LTE access devices which are base stations using shared spectrum, a set of P-LTE access devices which are gateways a wide area network, etc.

WiFi access network 1 includes WiFi AP 1 310, which has a corresponding wireless coverage area 311. WiFi access network 2 includes WiFi AP 2 312, which has a corresponding wireless coverage area 313. WiFi network 3 includes WiFi AP 3 314, which has a corresponding wireless coverage area 315. In the example of FIG. 3, the combination of the WiFi coverage areas (311, 313 and 315) is less than the full coverage P-LTE network coverage area. In some other embodiments, the combination of the WiFi coverage areas of the plurality of WiFi networks fully overlaps the coverage P-LTE network coverage area. In various embodiments, the coverage area corresponding to an individual WiFi network with a single access point is less than the P-LTE network coverage area 303. In some embodiments, a WiFi access point may be, and sometimes is, co-located with a P-LTE access device.

The edge computing network 325 includes a control server 324, e.g., a configuration controller server. The control server 324 is coupled to each of the P-LTE access devices (302, 304, 306, . . . , 308) via backhaul network 326 and/or the Internet. Each of the WiFi APs (310, 312, 314) is coupled to the control server, e.g. via Internet connection 328 and/or via a network, e.g. a backhaul network.

Communications system 300 further includes a plurality of end device (end device 1 316, end device 2 317, end device 3 318, . . . , end device N 320). At least some of the end devices are mobile devices which may move throughout system 300. Exemplary end devices include, e.g., rugged tablets, smart phones, cameras, modems, vehicles including wireless communications capability, various sensor devices, e.g., temperature sensor devices, security sensor devices, meter sensor devices, etc., and various smart devices, e.g., smart light, smart appliances, smart control device, e.g. smart door opener, etc. Each of the end devices (316, 317, 318, . . . , 320) includes a configuration profile module (CPM 340, CPM 342, CPM 344, . . . , CPM 346), respectively. The configuration profile module (CPM) of an end device communicates with the control server 320, e.g., receiving an initial communications profile to be used by the end device, sending reports including, e.g., device capabilities, applications being used, and key performance indicators (KPIs), e.g. on a per application basis, and receiving updated an updated communications profile, e.g., based on the KPI information, machine learning and/or artificial intelligence evaluations and determinations. In various embodiments, the updated communications profile identifies whether the end device is to use the P-LTE network or a WiFi network, e.g. on a per application basis, per UP/DL direction, and/or per time interval basis. In some embodiments, the updated communications profile further identifies which one of a plurality of alternative P-LTE access technologies is to be used, e.g. on a per application basis, per UP/DL direction, and/or per time interval basis, when a plurality of alternative access technologies is available and the selection is to use a P-LTE access technology. In some embodiments the updated communications profile further includes information identifying a QoS service level to use e.g. on a per application basis, per UP/DL direction, and/or per time interval basis.

Figure 4A:
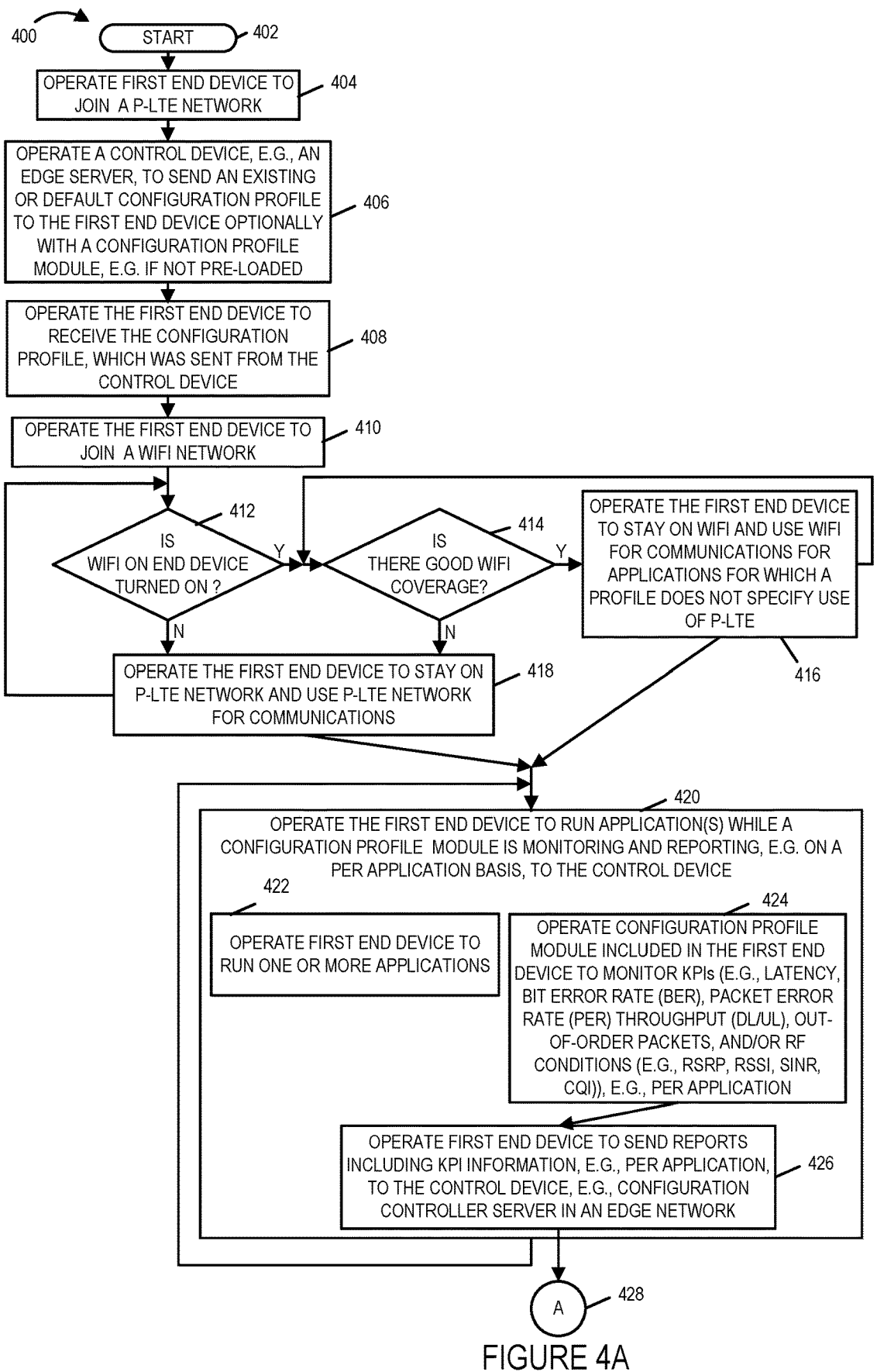
FIG. 4A is a first part of a flowchart of an exemplary method of operating a communications system in accordance with an exemplary embodiment.

FIG. 4, comprising the combination of FIG. 4A and FIG. 4B, is a flowchart 400 of an exemplary method of operating a communications system, e.g., communications system 300 of FIG. 3, in accordance with an exemplary embodiment. Operation of the exemplary method starts in step 402, in which the communications system is powered on and initialized. Operation proceeds from start step 402 to step 404.

In step 404 a first end device, e.g., end device 1 316, is operated to join a P-LTE network, e.g., the P-LTE network with coverage area 303. In some embodiments, step 402 includes operating the end device to send a registration message to a control device. In some embodiments, the control device is control server 324 in edge computing network 325. In some other embodiments, the control device is a server in a core network associated with the P-LTE network, said server in the core network in communication with the control server 324 in the edge network 325. In some embodiments, the registration request is sent via P-LTE access device 1 302. Operation proceeds from step 404 to step 406.

In step 406 a control device, e.g., an edge network configuration controller server 324, is operated to send an existing or default configuration profile to the first end device optionally with a configuration profile module, e.g. CPM 340, if not preloaded on the first end device. In some embodiments, the existing or default configuration profile, sometimes referred to a communications profile, specifies whether to use WiFi or P-LTE on a per application basis for one or more applications. A specification of whether to use WiFi or P-LTE for a particular application may, and sometimes does, apply to both UL/DL or may, and sometime does apply to a single direction, e.g., one of UL or DL. A specification may also be, and sometimes is, associated with a time interval, e.g. a day and time interval within the day. In some embodiments, a specification may also include QoS level information. In some embodiments, a specified QoS level is associated with a particular coding and modulation scheme among a plurality of alternative coding and modulation schemes. Operation proceeds from step 406 to step 408.

In step 408 the first end device is operated to receive the configuration profile, which was sent from the control device, e.g., configuration controller server 324 to the first end device. Operation proceeds from step 408 to step 410.

In step 410 the first end device is operated to join a WiFi network, e.g. WiFi network 1 including WiFi AP1 310 with WiFi coverage area 311. Operation proceeds from step 410 to step 412.

In step 412 the first end device determines if WiFi is turned on. In various embodiments WiFi can be turned-on or turned-off, e.g. by user input to first end device and/or in response to the current setting of user selection configuration information. If the determination of step 412 is that WiFi is not on, then operation proceeds from step 412 to step 418, in which the first end device is operated to stay on the P-LTE network and use the P-LTE network for communications, e.g. communications supporting one or more applications being run on the first end device. However, if the determination of step 412 is that WiFi is on, then operation proceeds from step 412 to step 414, in which the first end device determines if there is good WiFi coverage at the current location of the first end device. In some embodiments, determining if there is good WiFi coverage includes determining if the received signal strength (e.g., RSSI) of a reference signal from a WiFi AP, e.g., WiFi AP 1 310. is above a predetermined RSSI minimum acceptable threshold level, and determining if the noise level, e.g. SNR or SINR is above a minimum predetermined SNR or SINR threshold level. If the determination of step 414 is that the WiFi coverage is not good, then operation proceeds from step 414 to step 418, in which the first end device is operated to stay on the P-LTE network and use the P-LTE network for communications, e.g. communications supporting one or more applications being run on the first end device. However, if the determination of step 414 is that the WiFi coverage is good, then operation proceeds from step 414 to step 416, in which the first end device is operated to stay on the WiFi and use the WiFi for communications for applications for which the profile does not specify use of P-LTE. Operation proceeds from step 418 or step 416 to step 420. After a predetermined time, operation also proceeds from step 418 to the input of step 412 to check again if the WiFi is currently on, and/or from step 416 to the input of step 414, to check if WiFi quality is still good.

In step 430 the first end device, e.g., end device 1 316, is operated to run application(s) while the configuration profile module, e.g. CPM 340, is monitoring and reporting, e.g., on a per application basis, to the control device, e.g. to configuration controller server 324. Step 430 is performed repetitively, e.g. on an ongoing basis. Step 430 includes steps 422, 424, and 426. In step 422 the first end device is operated to run one or more applications. In step 424 the configuration profile module included in the first end device is operated to monitor key performance indicators (KPIs), e.g., on a per application basis. Exemplary KPIs include latency, bit error rate (BER), throughput (UL/DL), out-of-order packets, and/or radio frequency (RF) condition information, e.g., received signal received power (RSRP), received signal strength indicator (RSSI), signal to Interference plus noise ratio (SINR), signal to noise ratio (SNR), and channel quality indicator (CQI). Operation proceeds from step 424 to step 426. In step 426 the first end device is operated to send reports including KPI information, e.g., per application, to the control device, e.g. configuration controller server 424 in the edge network 325. Operation proceeds from step 426, via connecting node A 428 to step 430.

In step 430, which is performed repetitively on an ongoing basis, the control server, e.g., server 324, monitors for reports from end devices, said reports including KPI information, e.g., per application. Step 430 includes step 432 in which the control server receives a report including KPI information, e.g., per application, from said first end device, e.g., end device 1 316. In step 430 the control server may, and sometimes does, receive a report from another end device, e.g. end device 2 317, end device 3 318, end device N 320.

Operation proceeds from step 432 to step 434. In step 434 the control device, e.g., server 324, determines, e.g., on a per application basis and/or optionally with separate DL/UL determinations for one or more time intervals, e.g., using machine learning (ML) and/or artificial intelligence (AI) whether the first end device should operate on WiFi or P-LTE for each of one or more applications and/or UL/DL direction, if possible, based on end device application latency requirements and/or end device application throughput requirements. In some embodiments, step 434 includes step 436, in which the control device for a P-LTE determination, selects from among a plurality of alternate P-LTE access technologies and/or communications bands (e.g., using licensed spectrum, using shared spectrum (e.g., CBRS), or using unlicensed spectrum, e.g. MulteFire, LTE-M, LTE-U or Licensed Access Assist (LAA). Operation proceeds from step 434 to step 438.

In step 438 the control device, e.g., server 424, sends the first end device the determination, e.g., as part of an updated communications profile (sometimes referred to as a configuration profile), as to which network (WiFi or P-LTE) to use, e.g., for each application, UL/DL direction, and/or time period. In some embodiments, type of P-LTE to use may be, and sometimes is, also specified. In some embodiments, a QoS level is also specified for each application, UL/DL direction, and/or time period. Operation proceeds from step 438 to step 440.

In step 440 the first end device receives the determinations, as part on updated communications profile, as to which network to use (WiFi or P-LTE), e.g., for each application UL/DL direction and/time period. In some embodiments, type of P-LTE to use may be, and sometimes is, also received in step 440. In some embodiments, a QoS level is specified for each application, UL/DL direction, and/or time period, is also received in step 440. Operation proceeds from step 440 to step 442.

In step 442 the first end device is controlled to operate, if possible (e.g., based on WiFi on/off setting and/or RSSI), on the determined networks (e.g., WiFi or P-LTE) to use, e.g., for each applications, UL/DL direction and/or time period, in accordance with the received information from step 440. Step 442 may include one or more iterations of one or both of steps 446 and 448. In step 444 the first end device is operated to remain on the network currently being used for a particular combination of application, UP/DL direction and time period. In step 444 the first end device is operated to switch the network currently being used for a particular combination of application, UP/DL direction and time period to a network specified in the received determinations (of the updated communications profile) of step 440.

Figure 5A:
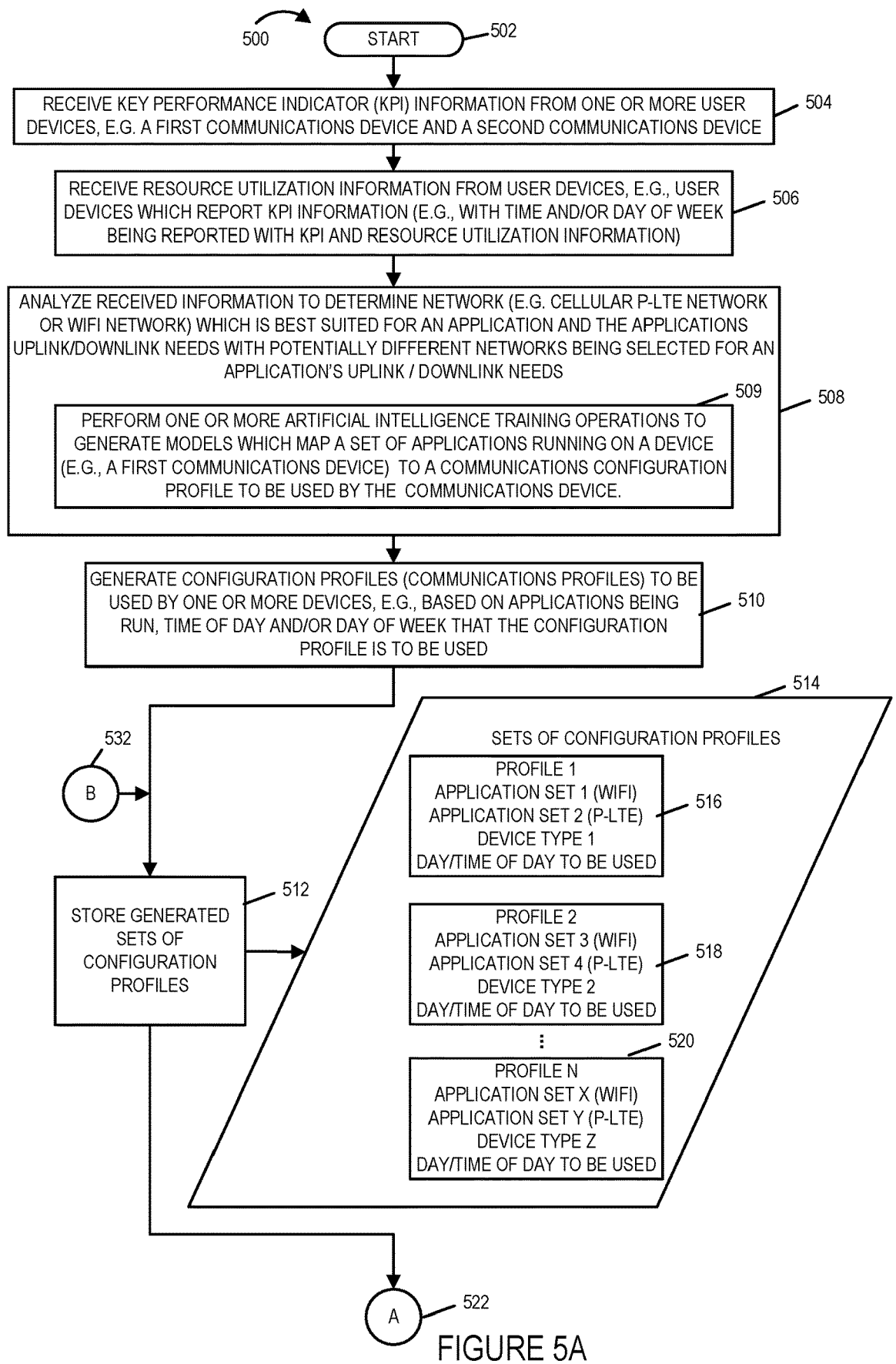
FIG. 5A is a first part of a flowchart of an exemplary method of operating a control server, e.g. a configuration server, in accordance with an exemplary embodiment.

FIG. 5, comprising the combination of FIG. 5A and FIG. 5B, is a flowchart 500 of an exemplary method of operating a control server, e.g. a configuration server, in accordance with an exemplary embodiment. The exemplary control server implementing the method of FIG. 5 is, e.g., control server 324, e.g., a configuration controller server, included in edge computing network 325 of FIG. 3. Operation starts in step 502 in which the configuration server is powered on and initialized. Operation proceeds from start step 502 to step 504.

In step 504 the configuration server receives key performance indicator (KPI) information (e.g. on a per application, per UL/DL direction, and/or per time interval basis) from one or more user devices, e.g., a first communications device, e.g., end device 1 316, and a second communications device, e.g., end device 2 317. In some embodiments, in step 504 the configuration server receives key performance including key performance information on a per application basis for one or more communications applications running on a first communications device. In some embodiments, in step 504 the configuration server receives key performance including key performance information on a per application basis for one or more communications applications running on a second communications device.

In some embodiments, the received key performance information includes at least two of: i) latency information, ii) bit error rate (BER) information, iii) packet error rate (PER) information, iv) uplink throughput, v) downlink throughput, vi) out-of-order packet information, and radio frequency (RF) condition information. In some embodiments said RF condition information includes: one or more of: a received signal received power (RSRP) value, a received signal strength indicator (RSSI) value, a signal to interference plus noise ratio (SINR) value, or iii) a channel quality indicator (CQI) value. In some embodiments, said received key performance information includes at least four of: i) latency information, ii) bit error rate (BER) information, iii) packet error rate (PER) information, iv) uplink throughput, v) downlink throughput, vi) out-of-order packet information, and radio frequency (RF) condition information.

Operation proceeds from step 504 to step 506. In step 506 the configuration server receives communications resource utilization information (e.g., on a per application basis and/or per UL/DL direction basis) from user devices which report KPI information (e.g., with time and/or day of week being reported with KPI and resource utilization information). In some embodiments, in step 506 the configuration server receives communications resource utilization information for the first communications device on a per application basis, said communications resource utilization information including uplink and/or downlink resources used on a per application basis for the one or more communications applications running on the first communications device. In some embodiments, in step 506 the configuration server receives communications resource utilization information for the second communications device on a per application basis, said communications resource utilization information including uplink and/or downlink resources used on a per application basis for the one or more communications applications running on the second communications device.

In some embodiments, KPI and resource information are communicated from a user device to the configuration server in a single report sent from the particular user device, e.g., on a periodic or repetitive basis. In some embodiments, an access device, e.g., an AP, base station or GW aggregates reports (including KPI and/or resource utilization information, e.g. on a per application basis), from multiple user devices and forwards the aggregated information to the configuration server, e.g. on a periodic or repetitive basis.

Operation proceeds from step 506 to step 508. In step 508 the configuration server analyzes the received information to determine the network (cellular e.g., P-LTE network or WiFi network) which is best suited for an application and applications uplink/downlink needs with potentially different networks being selected for an application's uplink/downlink needs. In some embodiments, when the P-LTE network is selected, e.g., for a particular combination of application, DL/UL direction, and time interval, a particular type of P-LTE access technology may be, and sometimes is also selected, e.g., using licensed spectrum, shared spectrum or unlicensed spectrum and communicating via a particular base station, access point or gateway device within the P-LTE network.

Step 508 includes step 509 in which the configuration server performs one or more artificial intelligence model training operations to generate models which map a set of applications running on a communications device, e.g. the first communications device, to a communications configuration to be used by said communications device (wherein the configuration specifies for the applications running on the communications device (e.g., first communications device, the network (e.g., WiFi or cellular (P-LTE)) to be used for each application with, in some cases, with separate network information being specified for uplink and downlink communications for one or more applications). Operation proceeds from step 508 to step 510.

In step 510 the configuration server generates communications profiles, sometimes referred to as configuration profiles, to be used by one or more devices, e.g. based on applications being run, time of day and/or day of week that the communications profile is to be used. Operation proceeds from step 510 to step 512.

In step 512 the configuration server stores the generated sets of configuration profiles (sometimes referred to as communications profiles) for one or more communications devices as sets of configuration profiles 514 in memory, e.g., within the configuration server or accessible by the configuration server. Sets of configuration profiles 514 includes different profiles, e.g., each profile corresponding to a different combination of: one or more sets of applications (e.g., a set of application for which cellular, e.g. P-LTE network is to be used and a set of applications for which WiFi is to be used), a device type and a day/time of day to be used. Sets of configuration (communications) profiles 514 includes profile 1 516, profile 2 518, . . . , profile N 520.

In one example, profile 1 516 lists: i) a first application (included in application set 1 with designation information UL&DL) for which the WIFI network is to be used for both uplink and downlink communications corresponding to the first application; ii) a second application (included in application set 2 with designation information UL&DL) for which the cellular network is to be used for both uplink and downlink communications; and iii) a third application for which the cellular network is to be used for one of the uplink or downlink communications and for which the WIFI network is to be used for the one of the uplink or downlink communications (included in both application set 1 and application set 2 but with the designations UL in one set and the designation DL in the other set). Operation proceeds from step 512, via connecting node A 522, to step 524.

In step 524 the configuration server receives a request for a configuration profile optionally including one or more of: applications profile is to be used for, device type with which profile is to be used, time communications profile is to be used, e.g., time of day, day of week, etc. Operation proceeds from step 524 to step 526.

In step 526 the configuration server selects a profile to be used based on input information, e.g., applications to be used, device type (e.g., general purpose user type device such as a cell phone vs a sensor or fixed appliance type device), time is to be used (optionally implemented using an AI trained model to match inputs to profile to be returned). Operation proceeds from step 526 to step 528.

In step 528 the configuration server communicates, e.g., returns, the selected profile (e.g., the first profile 516) to the device which requested the profile. Operation proceeds from step 528 to step 520.

In step 530 the configuration server receives KPI and resource utilization information and updates model or models to map configuration request related information to profile to be returned. Operation proceeds from step 520, via connecting node B 532 to step 512.

Figure 6:
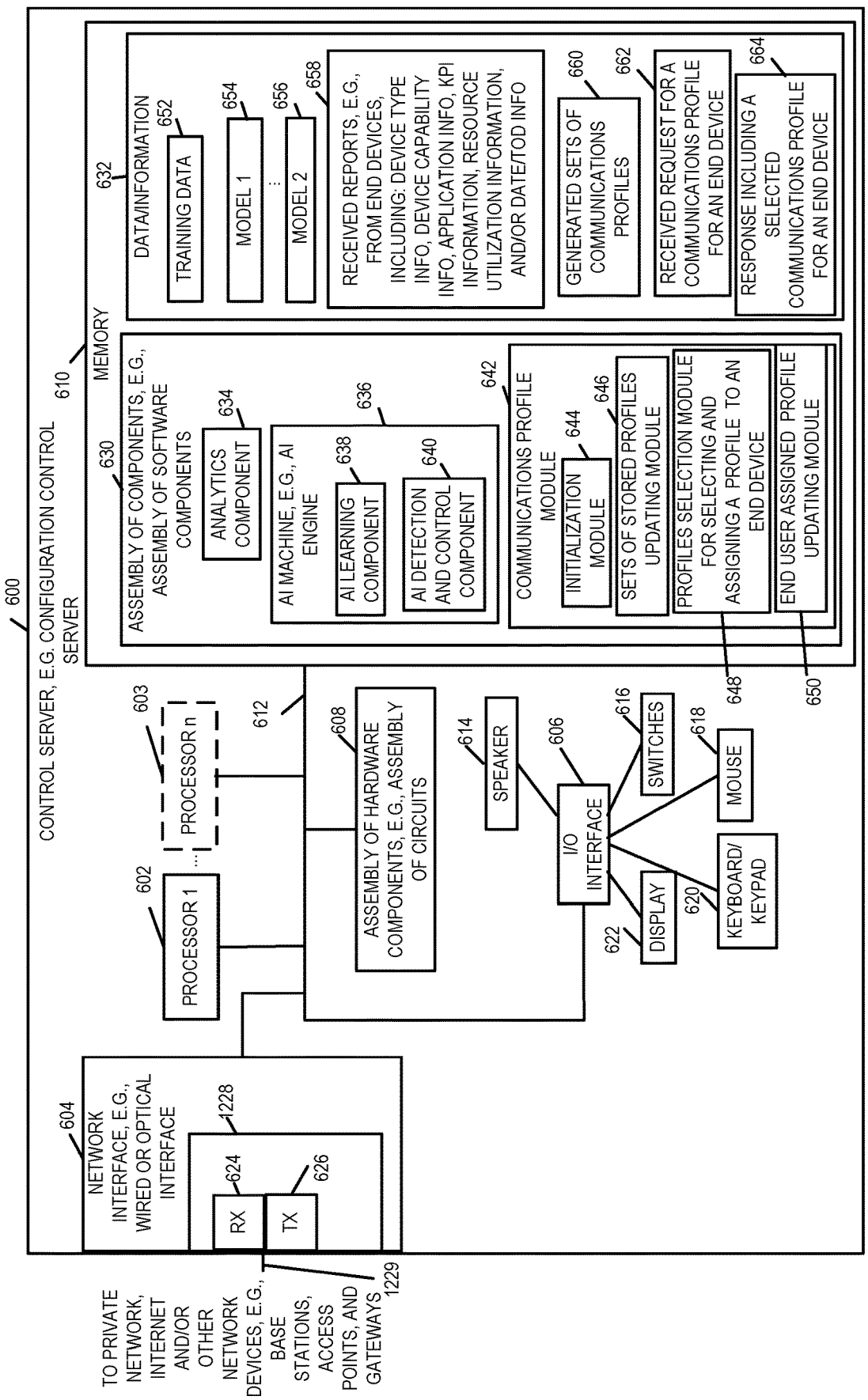
FIG. 6 is a drawing of an exemplary control server, e.g. a configuration server which selects for end devices whether to use WiFi or P-LTE for communications on a per application basis based on KPI and resource utilization information, in accordance with an exemplary embodiment.

FIG. 6 is a drawing of an exemplary control server 600, e.g., a configuration control server, in accordance with an exemplary embodiment. Control server 600 includes a processor 602, e.g., a CPU, a network interface 604, e.g. a wired or optical interface, an I/O interface 606, an assembly of hardware components 608, e.g., assembly of circuits, and memory 610, coupled together via bus 612, via which the various elements may interchange data and information. In some embodiments, control server 600 includes one or more additional processors, e.g. processor n 603, coupled to the bus 612.

Network interface 604 includes a receiver 624 and a transmitter 626, which couple the control server 600 to a private network, the Internet, and/or other network devices, e.g. base stations, access points, and/or gateways (included in P-LTE network being managed and/or in one or more WiFi networks having coverage areas overlapping (partially or fully) with the P-LTE-network's coverage area). In some embodiments, the receiver 624 and transmitter 624 are part of a transceiver 628, e.g., a transceiver chip. Exemplary signals received via receiver 624 include a request from an end device to join a P-LTE network, a report from an end device including KPI information and/or resource utilization information, e.g. on a per application basis, per UL/DL basis, and/or date/TOD basis, and a request from and end device for an updated communications profile, sometimes referred to as a configuration profile. Exemplary signals send via transmitter 626 include an initial communications (configuration) profile to an end device, and an updated communications (configuration) profile to an end device, e.g. send in response to a request from the end device or pushed out to the end device, e.g., as a part of a scheduled update, e.g. every 8 hours, or in response to a determination, e.g., by AI within the control server 600 that an update is beneficial to the end device or to the system.

Control server 600 further includes a plurality of I/O devices (speaker 614, switches 616, mouse 618, keyboard/keypad 620, and display 622) coupled to I/O interface 606, via which the various devices (6014, 616, 618, 620, 622) may communicate with other components within control server 600.

Memory 610 includes an assembly of components 630, e.g., an assembly of software components, and data/information 632. Assembly of software components 630 includes an analytics component 634, an artificial intelligence (AI) machine, e.g., an AI engine, and a communications profile module 642. AI machine 636 includes an AI learning component 638, e.g. for generating and/or updating one or more models based on training data and/or received reports including KPI and resource utilization information on a per application basis, and an AI detection and control component 640, e.g. for determining when new models need to be generated. Communications profile module 642 includes an initialization module 644, a sets of stored profiles updating module 646, a profile selection module for selecting and assigning a communications profile to an end device 648 from a set of stored profiles, and an end user assigned profile updating module 650, e.g. for determining when a communications profile being used by an end device should be updated, e.g., in response to a request from the end device or in accordance with an updating schedule or in response to an AI determination that updating is beneficial, and for controlling the update, e.g. generating a message communicating the updated communications (configuration) profile, and sending the message to the end device.

Figure 7:
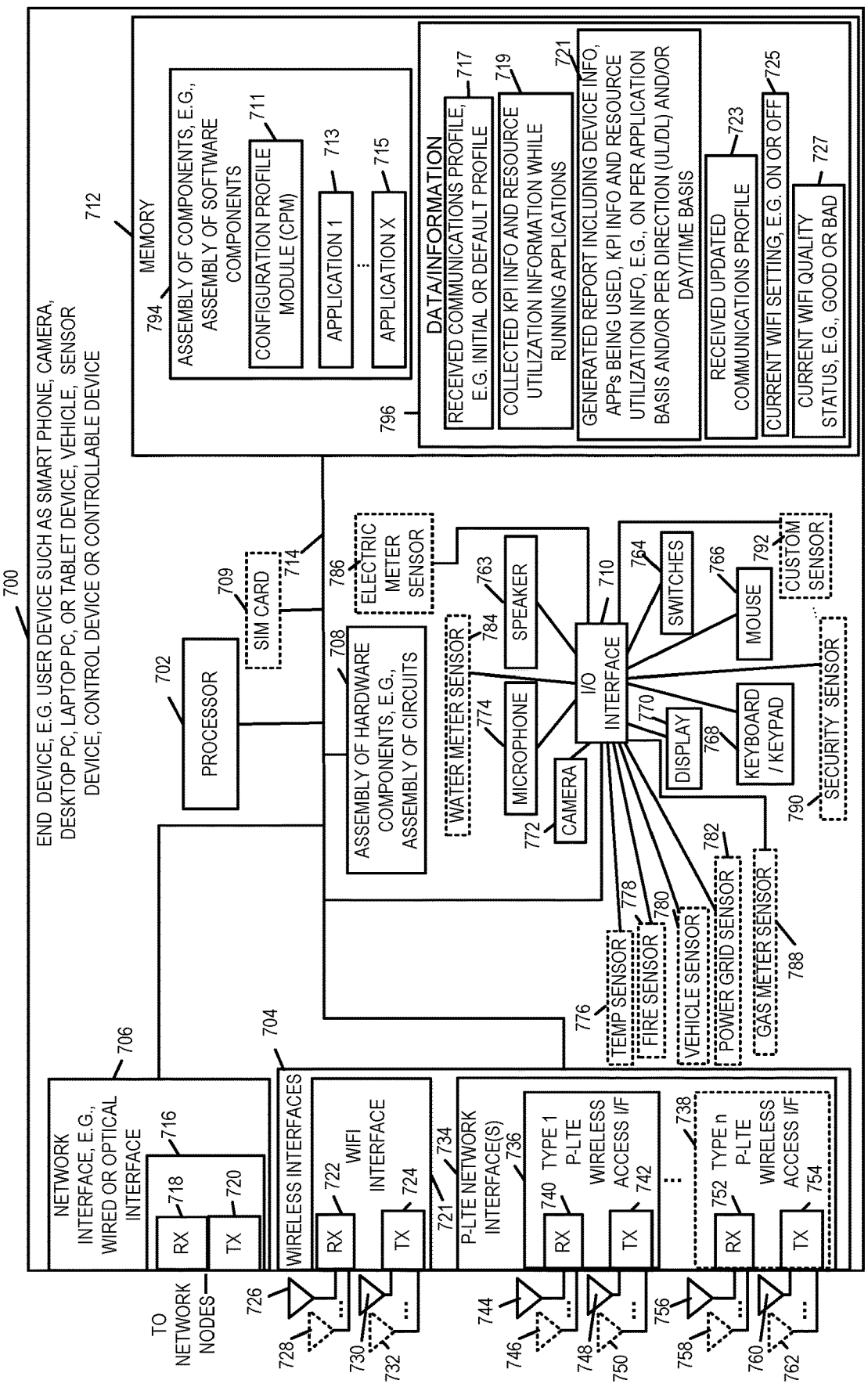
FIG. 7 is a drawing of an exemplary end device, e.g., an end device supporting WiFi network and cellular, e.g. P-LTE, network communications, in accordance with an exemplary embodiment.

FIG. 7 is a drawing of an exemplary end device 700, e.g., a device supporting WiFi network and P-LTE network communications, in accordance with an exemplary embodiment. Exemplary end device 700 is, e.g. a user device such as a smart phone, camera device, desktop PC, laptop PC or tablet device, a vehicle, a sensor device, a control device or a controllable device. End device 700 is, e.g. one of the end devices (end device 1 316, end device 317, end device 3 318, . . . , end device N 320) of system 300 of FIG. 3, an end device implementing steps of the method of flowchart 400 of FIG. 4 and/or an end device described with respect to flowchart 500 of FIG. 5.

Exemplary end device 700 includes a processor 702, e.g., a CPU, a wireless interfaces 704, a network interface 706, e.g., a wired or optical interface, an I/O interface 710, an assembly of hardware components 708, e.g., an assembly of circuits, memory 712, and in some embodiments, SIM card 709, coupled together via a bus 714 over which the various elements may interchange data and information. Wireless interfaces 704 include a WiFi interface 721, and P-LTE interface(s) 734.

WiFi interface 721 includes a wireless receiver 722 coupled to one or more receive antennas 726, . . . , 728, and a wireless transmitter 724 coupled to one or more transmit antennas 730, . . . , 732. In some embodiments, the same antenna(s) are used for transmit and receive.

P-LTE network interface(s) 734 includes one or more wireless P-LTE access interface(s) (type 1 P-LTE wireless access interface 736, . . . , (type n P-LTE wireless access interface 736). Different types of wireless P-LTE interfaces corresponding to different access technologies, communications protocols, and/or different bandwidth, e.g. a base station using licensed spectrum, a CBRS base station using shared spectrum, a base station using unlicensed spectrum, a gateway supporting LTE-machine (LTE-M), etc. Type 1 P-LTE wireless access interface 736 includes a wireless receiver 740 coupled to one or more receive antennas 744, . . . , 746, and a wireless transmitter 742 coupled to one or more transmit antennas 748, . . . , 750. In some embodiments, the same antenna(s) are used for transmit and receive. Type n P-LTE wireless access interface 738 includes a wireless receiver 752 coupled to one or more receive antennas 756, . . . , 758, and a wireless transmitter 754 coupled to one or more transmit antennas 760, . . . , 762. In some embodiments, the same antenna(s) are used for transmit and receive.

Network interface 706 includes a receiver 718 and a transmitter 720. In some embodiments, receiver 718 and transmitter 720 are included as part of a transceiver 716.

End device 700 further includes a plurality of input/output devices (speaker 763, switches 764, mouse 766, keyboard/keypad 768, display 770, e.g., a touch screen display, camera 772, microphone 774, and, in some embodiments, one or more of: temperature sensor 766, fire sensor 778, vehicle sensor 780, water meter sensor 784, electric meter sensor 786, power line sensor 782, gas meter sensor 788, security sensor 790, . . . , custom sensor 792) which are coupled to I/O interface 710 allowing the various I/O devices to communicate with other elements coupled to bus 714.

Memory 712 includes an assembly of components 794, e.g., an assembly of software components, and data/information 796.

Assembly of components 794 includes a configuration profile module (CPM) 711, and a plurality of applications (application 1 713, . . . , application X 715). The configuration profile module 711, is some embodiments, is pre-loaded on the end device 700. In other embodiments, the configuration profile module 711 is downloaded, e.g., from a server, e.g. configuration controller server 324. Different ones of applications (713, . . . 713) may, and sometimes do, have different needs and requirements requiring latency and bandwidth, e.g., for uplink and downlink communications. Different end devices 700 may, and sometimes do, have different device capabilities and a different set of applications. At different times device 700 may have a different subset of its set of applications (713, . . . 715) being active.

Data/information 796 includes a received communications profile 717, e.g., an initial or default profile, collected KPI information and resource utilization information 719, e.g. on a per application basis, which was collected while the applications were running, a generated report 721 including, e.g., device information (device type and device capability information), information identifying applications being used, KPI and resource information, e.g., on a per application basis and/or per direction (UL/DL) basis, and/or time basis, e.g. day of week and/or time of day (TOD) basis. Data/information 796 further includes a received updated communications profile 723, e.g., including information identifying which of WiFi or P-LTE to use for each application and optionally further based on UL/DL direction and/or data/TOD information. In some embodiments, where P-LTE is to be used, and the device 700 supports a plurality of different type of P-LTE wireless interfaces, the profile 723 further identifies the specific type of P-LTE wireless interface to be used. In some embodiments, communications profile 717 is received in response to end device powering one and joining a P-LTE, e.g. as part of a registration process. In some embodiments, updated communications profile 723 is received after end device has been operating and running applications and has sent at least one generated report 721 to the configuration control server. In some embodiments, an updated communications profile is sent to end device 700 in response to a request for an update from device 700. In some embodiments, an updated communications profile is sent to end device 700, as part of a push of updated information out from the configuration control server to active end devices, e.g., on a periodic basis, and/or in response to a determination by AI included in the control server that an communication profile update to end device 700 is beneficial to end device 700 and/or to a system, e.g. system 300.

Data/information 796 further includes the current state of WiFi setting for device 700, e.g., on or off based on user input of pre-configured settings of device 700, and the current WiFi quality status, e.g., good or bad, based on measured received signals from one or more WiFi access points and pre-determined acceptable minimal level threshold, e.g. for RSSI and SNR.

Figure 8A:
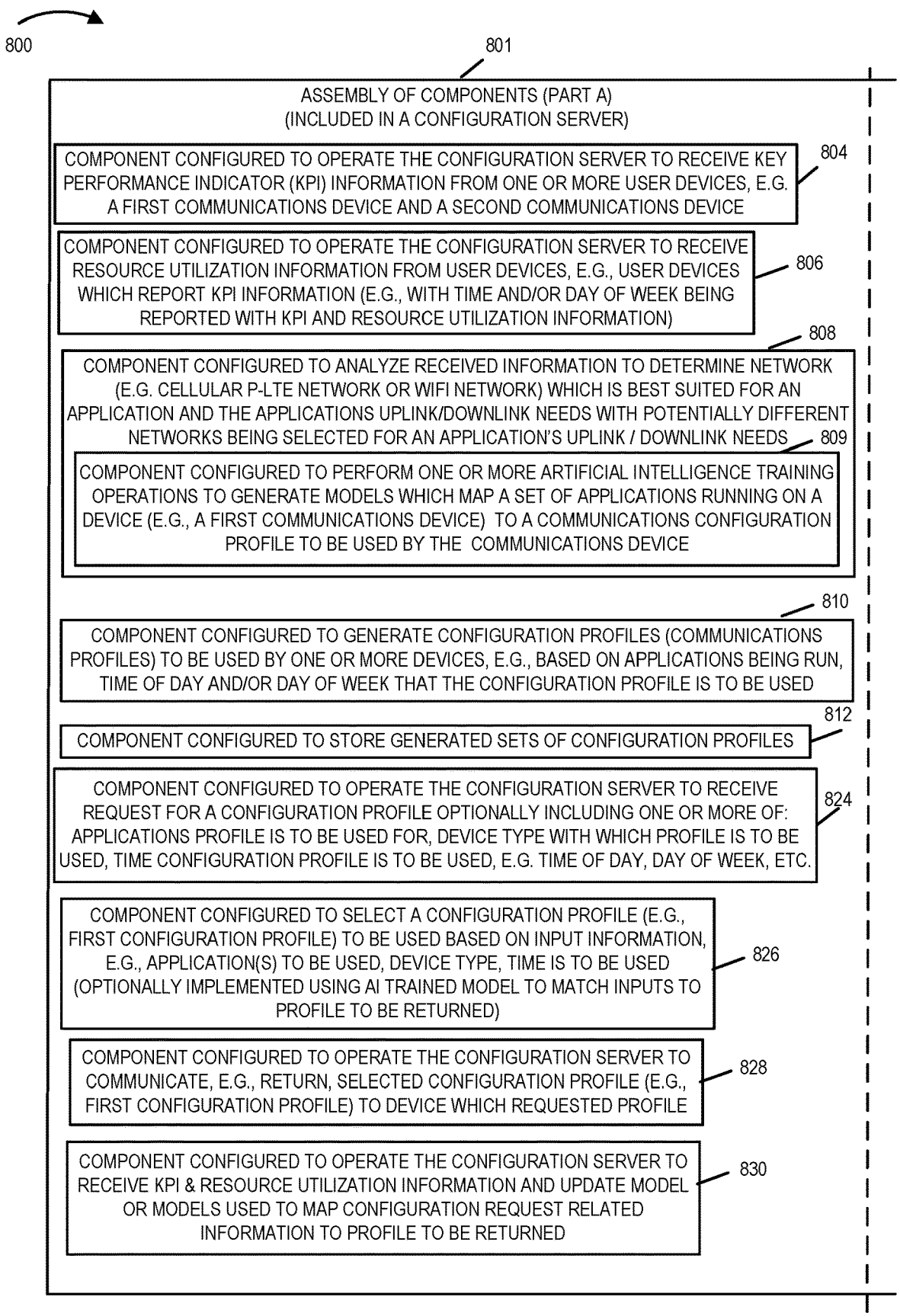
FIG. 8A is a first part of a drawing of an exemplary assembly of components which may be include in an exemplary control server, e.g. a configuration server, in accordance with an exemplary embodiment.
Figures 8, 8B:
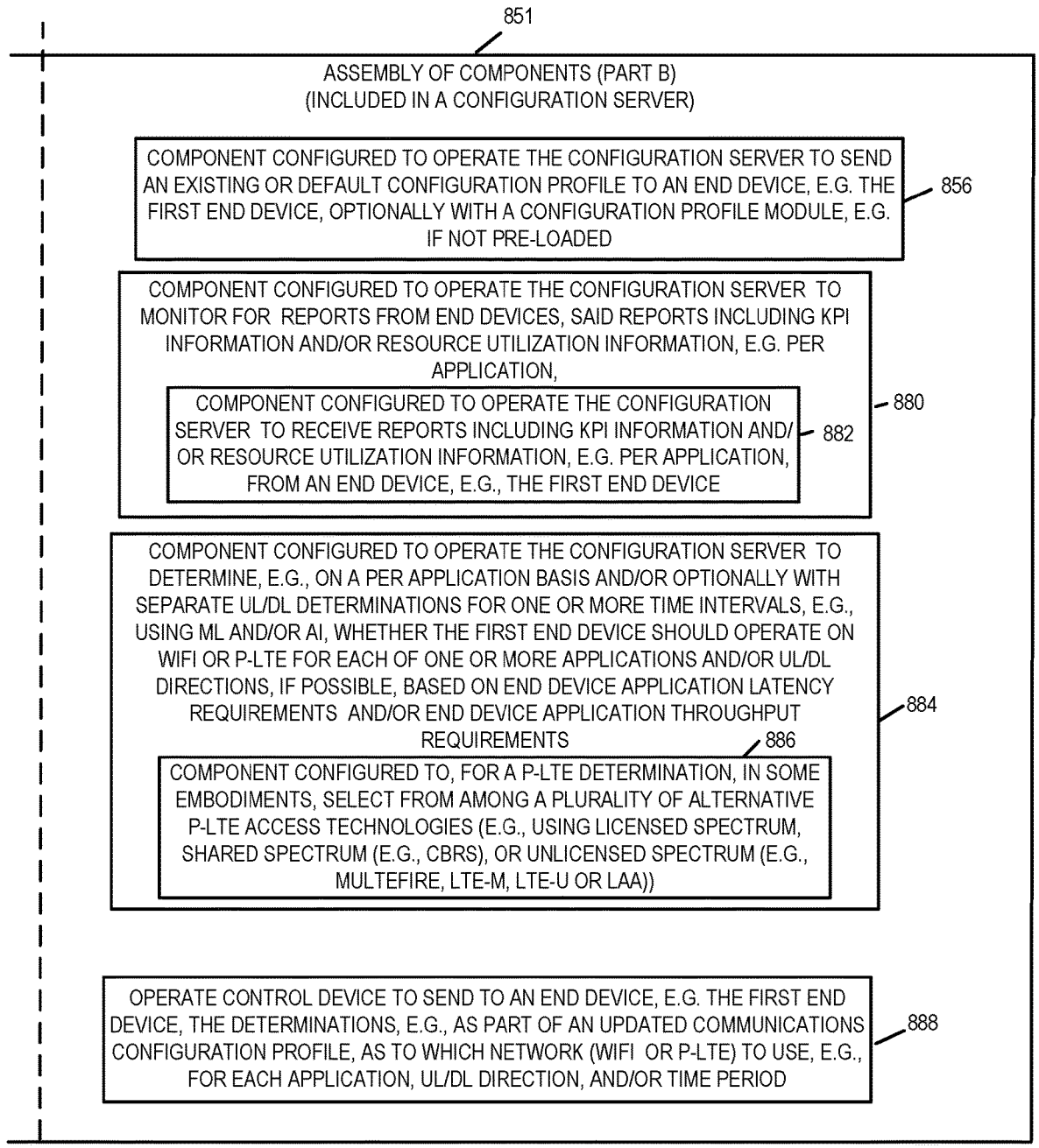
FIG. 8B is a second part of a drawing of an exemplary assembly of components which may be include in an exemplary control server, e.g. a configuration server, in accordance with an exemplary embodiment.
FIG. 8 comprises the combination of FIG. 8A and FIG. 8B.

FIG. 8, comprising the combination of FIG. 8A and FIG. 8B, is a drawing of an exemplary assembly of components 800, comprising Part A 801 and Part B 851, which may be, and sometimes is, included in an exemplary configuration server, e.g. configuration server 324 of system 300 of FIG. 3 or configuration server 600 of FIG. 6, and/or a configuration server described with respect to the flowcharts of FIGS. 4 and/or 5, in accordance with an exemplary embodiment.

The components in the assembly of components 800 can, and in some embodiments are, implemented fully in hardware within a processor, e.g., processor 602, e.g., as individual circuits. The components in the assembly of components 800 can, and in some embodiments are, implemented fully in hardware within the assembly of hardware components 608, e.g., as individual circuits corresponding to the different components. In other embodiments some of the components are implemented, e.g., as circuits, within processor 602 with other components being implemented, e.g., as circuits within assembly of components 608, external to and coupled to the processor 602. As should be appreciated the level of integration of components on the processor and/or with some components being external to the processor may be one of design choice. Alternatively, rather than being implemented as circuits, all or some of the components may be implemented in software and stored in the memory 610 of the configuration server 600, with the components controlling operation of configuration server 600 to implement the functions corresponding to the components when the components are executed by a processor e.g., processor 602. In some such embodiments, the assembly of components 800 is included in the memory 610 as part of assembly of software components 630. In still other embodiments, various components in assembly of components 800 are implemented as a combination of hardware and software, e.g., with another circuit external to the processor providing input to the processor which then under software control operates to perform a portion of a component's function.

When implemented in software the components include code, which when executed by a processor, e.g., processor 602, configure the processor to implement the function corresponding to the component. In embodiments where the assembly of components 800 is stored in the memory 610, the memory 610 is a computer program product comprising a computer readable medium comprising code, e.g., individual code for each component, for causing at least one computer, e.g., processor 602, to implement the functions to which the components correspond. In some embodiments, multiple processors, e.g., processor 602 and processor 603 are used in place of a single processor 602.

Completely hardware based or completely software based components may be used. However, it should be appreciated that any combination of software and hardware, e.g., circuit implemented components may be used to implement the functions. As should be appreciated, the components illustrated in FIG. 8 control and/or configure the configuration server 600 or elements therein such as the processor 602, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method, e.g. steps of the method of flowchart 400 of FIG. 4 and/or steps of the method of flowchart 500 of FIG. 5.

Assembly of components 800 includes a components 804 configured to operate the configuration server to receive key performance indicator (KPI) information from one or more user devices, e.g., including a first communications device and a second communications device, optionally with time tag information, a component 806 configured to operate the configuration server to receive resource utilization information from user devices, e.g., user devices which report KPI information, e.g. with time tag information (e.g., time and or day of week) being reported with the KPI and the resource utilization information. Exemplary types of KPI information include: i) latency information, ii) bit error rate (BER) information, iii) packet error rate (PER) information, iv) uplink throughput, v) downlink throughput, vi) out-of-order packet information, and radio frequency (RF) condition information. Different type of RF condition information, which may be, and sometimes are, received include: i) received signal received power (RSRP) values, ii) a received signal strength indicator (RSSI) values, signal to interference plus noise ratio (SINR) values and/or SNR values, and channel quality indicator (CQI) values. Received sets of KPI information, which were sourced from a communications device (e.g., an end device), may be, and sometimes are, on a per application basis. Resource utilization information, which were sourced from a communications device (e.g., an end device), may be, and sometimes are, on a per application basis.

Assembly of components 800 further includes a component 808 configured to analyze received information to determine which network (e.g., cellular P-LTE network or WiFi network) is better suited for an application and the applications uplink/downlink needs with potentially different networks being selected for an application uplink/downlink needs. In some embodiments, the cellular P-LTE network may, and sometimes does, include a plurality of different alternative access technologies and selecting the cellular P-LTE network for an application includes selecting one of the plurality of alternative P-LTE access technologies. Some R-LTE access technologies may be better suited for applications running on a first type of communications device, e.g. a user device such as a smart phone, while other types of P-LTE access technologies may be better suited for a second type of communications device, e.g., a sensor device, smart appliance, or control device. Component 808 includes a component 809 configured to perform one or artificial intelligence (AI) training operations to generate modules which map a set of applications running on a device, e.g. a first communications device, to a communications configuration profile to be used by the communications device. Component 809 in some embodiments utilizes machine learning (ML).

Assembly of components 800 further includes a component 810 configured to generate configuration profiles, sometimes referred to as communications profiles, to be used by one or more devices (e.g. end devices), e.g. based on: device type, applications being run, and/or time of day and/or day of week that configuration profile is to be used. An exemplary configuration profiles includes, e.g., i) a list of applications which are to be communicated using a WiFi network, optionally with information indicating the communications direction corresponding to each application (UL & DL, DL only, or UL only), ii) a list of applications which are to be communicated using a cellular, e.g. P-LTE network, optionally with information indicating the communications direction corresponding to each application (UL & DL, DL only, or UL only), iii) device type information, iv) and day/time information indicating, e.g., day(s) of the week and time when the profile is to be used. In some embodiments, the profile may include multiple lists corresponding to different specific WiFi networks, e.g., a particular private WiFi network associated with a particular service provider and/or providing more secure communications, or a public WiFi network. In some embodiments, the configuration profile may include multiple lists corresponding to different specific P-LTE networks, e.g., corresponding to different access technologies, different type of spectrum (licensed, shared, unlicensed), different communications bands and/or different communications protocols. Assembly of components 800 further includes a component 812 configured to store the generated sets of communications profiles, e.g., within memory of the configuration server, or in a storage device coupled to and accessible by the configuration server.

Assembly of components 800 further includes a component 824 configured to operate the configuration server to receive a request for a configuration profile optionally including one or more of: applications for which the profile is to be used, device type information (e.g., i) general user device such as smart phone or sensor device, ii) Android device or iPhone device, iii) model information), device capability information (e.g., access technologies supported, communications protocols supported, frequency ranges supported, number of RX/TX pairs included, number of antennas, etc), time (e.g., day of week and/or TOD) the configuration profile is intended to be used, and a component 826 configured to select a configuration profile (e.g., a first configuration profile) from among the sets of generated profiles, to be used based on input information, e.g. application(s) to be used, device type, and time to be used. In some embodiments, component 826 is implemented using an AI trained mode to match inputs (in a received request) to the profile to be returned.

Assembly of components 800 further includes a component 828 configured to operate the configuration server to communicate, e.g. return, the selected configuration profile (e.g., the first configuration profile, to the device which requested the profile. Assembly of components 800 further includes a component 830 configured to operate the configuration server to receive KPI and resource utilization information and update model or models used to map configuration request related information to profile to be returned.

Assembly of components 800 further includes a component 856 configured to operate the configuration server to send an existing or default configuration profile to an end device optionally with a configuration profile module, e.g. if not pre-loaded on the end device, e.g., in response to the end device joining the cellular, e.g., P-LTE network to which the configuration server belongs. Assembly of components 800 further includes a component 880 configured to operate the configuration server to monitor for reports from end devices, said reports including KPI information and/or resource utilization information, e.g. on a per application basis. Component 880 includes a component 882 configured to operate the configuration server to a receive reports from an end devices, e.g., a report from a first end device a report from a second end device, each report including KPI information and/or resource utilization information, e.g. on a per application basis.

Assembly of components 800 further includes a component 884 configured to operate the configuration server to determine (e.g. on a per application basis and/or optionally with separate UL/DL determinations for one or more time intervals, e.g. using machine learning (ML) and/or AI) whether an end device (e.g., first end device) should operate on a WiFi network or a cellular (P-LTE) network for each of one or more applications and/or UL/DL directions, (if possible based on user setting of device and received signal information), based on end device application latency requirements and/or end device application throughput requirements. In some embodiments component 884 includes a component 886 configured to, for a P-LTE determination, in some embodiments, select from among a plurality of alternative P-LTE access technologies (e.g., using licensed spectrum, using shared spectrum (e.g., CBRS), or using unlicensed spectrum (e.g., MulteFire, LTE-M, LTE-U, or LAA).

Assembly of components 800 further includes a component 888 configured to send the end device, e.g. first end device, the determinations (e.g., from component 884 and/or 886), e.g., as part of an updated configuration profile (communications profile), as to which network (WiFi or cellular (P-LTE)) to use for each combination of: application, UL/DL direction, and/or time period of interest.

Figure 9:
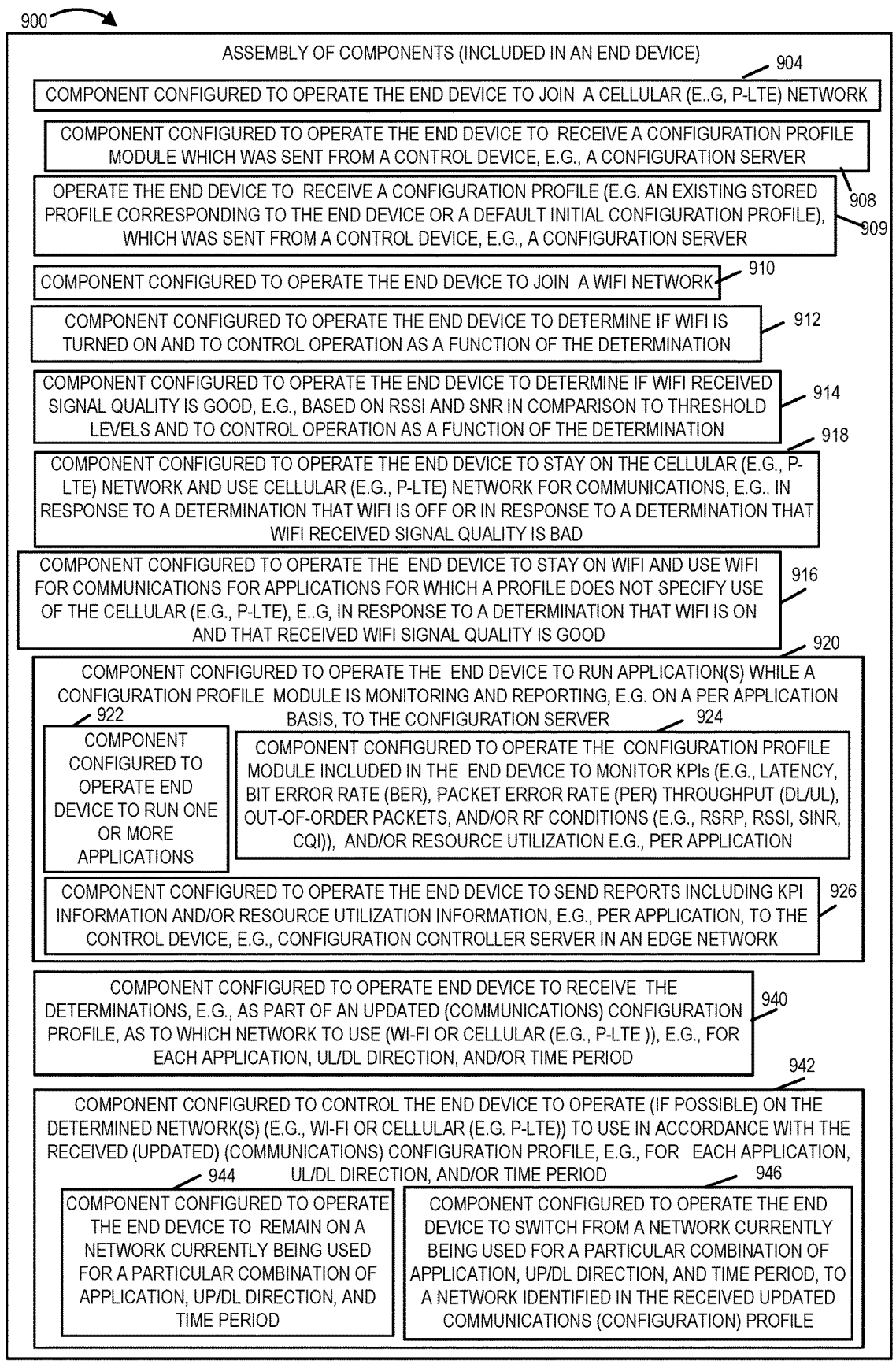
FIG. 9 is a drawing of an exemplary assembly of components which may be include in an exemplary end device, in accordance with an exemplary embodiment.

FIG. 9 is a drawing of an exemplary assembly of components 900 which may be, and sometimes is, included in an end device, e.g. any of end devices (end device 1 316, end device 2 317, end device 3 318, . . . , end device N 320) of system 300 of FIG. 3 or end device 700 of FIG. 7, and/or an end device implementing steps of a method, e.g., shown or described with respect to flowchart 400 of Figure and/or flowchart 500 of FIG. 5, in accordance with an exemplary embodiment.

The components in the assembly of components 900 can, and in some embodiments are, implemented fully in hardware within a processor, e.g., processor 702, e.g., as individual circuits. The components in the assembly of components 900 can, and in some embodiments are, implemented fully in hardware within the assembly of hardware components 708, e.g., as individual circuits corresponding to the different components. In other embodiments some of the components are implemented, e.g., as circuits, within processor 702 with other components being implemented, e.g., as circuits within assembly of components 708, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 712 of the end device 700, with the components controlling operation of end device 700 to implement the functions corresponding to the components when the components are executed by a processor e.g., processor 702. In some such embodiments, the assembly of components 900 is included in the memory 712 as part of assembly of software components 794. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 702, configure the processor to implement the function corresponding to the component. In embodiments where the assembly of components 900 is stored in the memory 712, the memory 712 is a computer program product comprising a computer readable medium comprising code, e.g., individual code for each component, for causing at least one computer, e.g., processor 702, to implement the functions to which the components correspond. In some embodiments, multiple processors, e.g., processor 702 and one or more additional processors are used in place of a single processor 702.

Completely hardware based or completely software based components may be used. However, it should be appreciated that any combination of software and hardware, e.g., circuit implemented components may be used to implement the functions. As should be appreciated, the components illustrated in FIG. 9 control and/or configure the end device 900 or elements therein such as the processor 702, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method, e.g. steps of the method of flowchart 400 of FIG. 4 and/or steps of the method of flowchart 500 of FIG. 5.

Assembly of components 900 includes a component 904 configured to operate an end device to join a cellular (e.g., P-LTE) network, a component 908 configured to operate the end device to receive a configuration profile module which was sent from a control device, e.g., a configuration server, a component 909 configured to operate the end device to receive and configuration profile (e.g., an existing stored profile corresponding to the end device or a default initial configuration profile) which was send form a control device, e.g., a configuration server, e.g. in response to the end device joining the cellular (e.g., P-LTE) network.

Assembly of components 900 further includes a component 910 configured to operate the end device to join a WiFi network, a component 912 configured to operate the end device to determine if WiFi is turned on and to control operation as a function of the determination, a component 914 configured to operate the end device to determine if WiFi received signal quality is good, e.g., based on RSSI and SNR in comparison to threshold levels, and to control operation as a function of the determination. Assembly of components 900 further includes a component configured to operate the end device to stay on the cellular (e.g., P-LTE) and use the cellular (e.g., P-LTE) network for communications, e.g., in response to a determination that WiFi is off or in response to a determination that WiFi received signal quality is bad, and a component 916 configured to operate the end device to stay on WiFi and use WiFi for communications for application for which a profile does not specify use of cellular (e.g. P-LTE), e.g., in response to a determination that WiFi is on and that received WiFi signal quality is good.

Assembly of components 900 further includes a component 920 configured to operate the end device to run application(s) while a configuration profile module (CPM) included in the end device is monitoring and reporting, e.g., one a per application basis, to the configuration server. Component 920 includes a component 922 configured to operate the end device to run one or more applications, a component 924 configured to operate the configuration profile module included in the end device to monitor KPI's (e.g., latency, bit error rate (BER), packet error rate (PER), throughput (DL/UL), out-of order packets, and/or RF conditions (e.g., RSRP, RSSI, SINR, SNR, CQI) and/or resource utilization information, e.g., on a per application basis, and a component 926 configured to operate the end device to generate and send reports including KPI information and/or resource utilization information, e.g., per application, to a control device, e.g., to the configuration server.

Assembly of components 900 further includes a component 940 configured to operate the end device to receive the determination, e.g., as part of an updated (communications) configuration profile as to which network to use (WiFi or cellular (e.g., P-LTE)), e.g., for each application, UL/DL direction, and/or time period, and a component 942 configured to control the end device to operate (if possible) on the determined network(s) (e.g., WiFi or cellular (e.g., P-LTE) in accordance with the received (updated) (communications) configuration profile, e.g., for each application, UL/DL direction, and/or time period. Component 942 includes a component 944 configured to operate the end device to remain on a network currently being used for a particular combination of application, UL/DL direction, and time period, e.g., in accordance with the received updated communications configuration profile, and a component 946 configured to operate the end device to switch from a network currently being used for a particular combination of application, UL/DL direction, and time period, to a different network identified in the received updated communications configuration profile for the particular combination of application, UL/DL direction, and time period.

Figure 10:
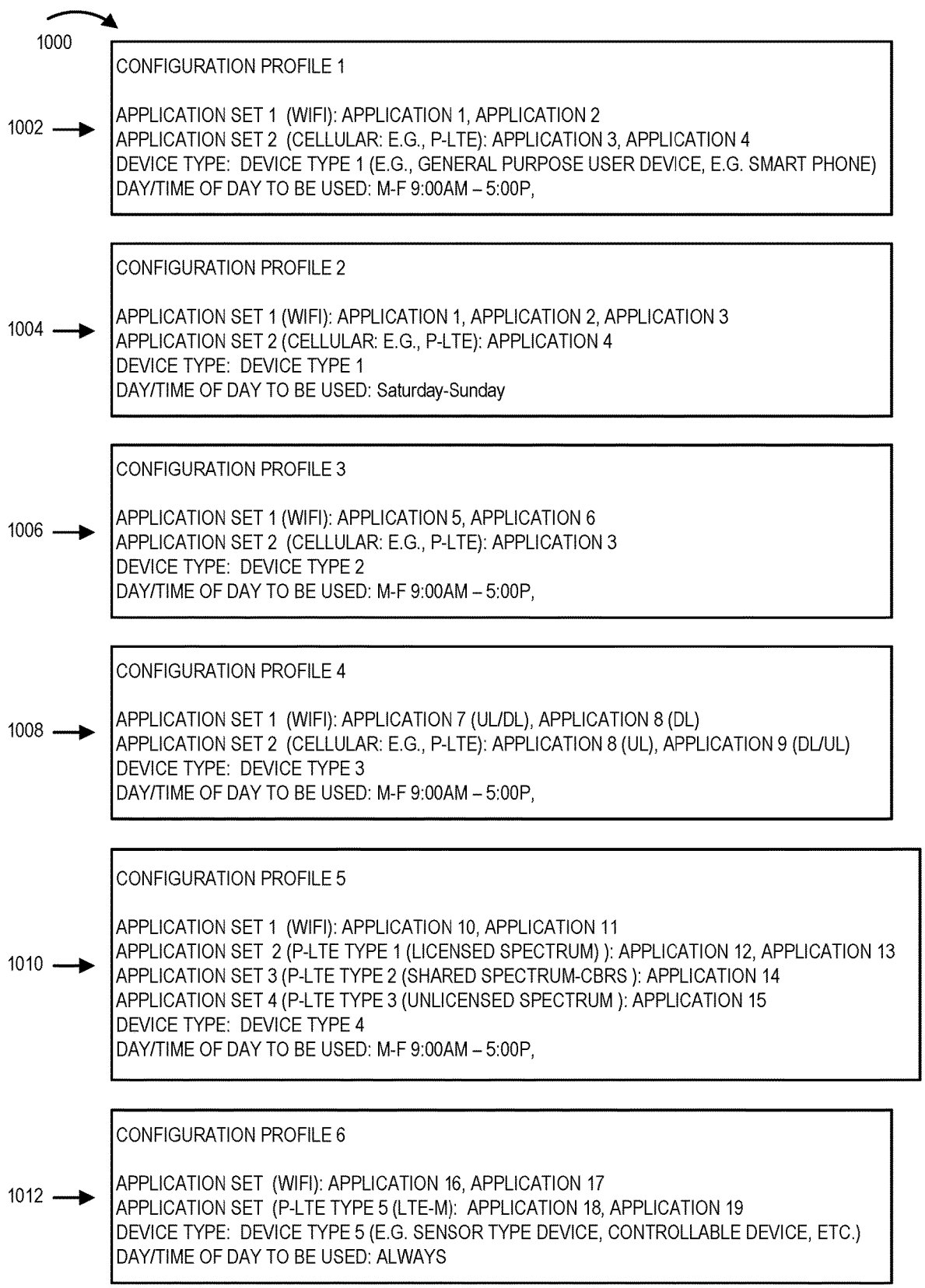
FIG. 10 is a drawing of exemplary configuration profiles, in accordance with an exemplary embodiment.

FIG. 10 is a drawing of exemplary set of configuration profiles 1000, in accordance with an exemplary embodiment. Exemplary set of configuration profiles includes: configuration profile 1 1002, configuration profile 2 1004, configuration profile 3 1006, configuration profile 4 1008, configuration profile 5 1010, and configuration profile 6 1012.

Configuration profile 1 1002, which corresponds to device type 1, identifies a first set of applications={application 1, application 2} for which a WiFi network is to be used for communications on weekdays (M-F) during the time range of 9:00 AM-5:00 PM, and identifies a second set of applications={application 3, application 4} for which a cellular network, e.g., a P-LTE network, is to be used for communications on weekdays (M-F) during the time range of 9:00 AM-5:00 PM.

Configuration profile 2 1004, which also corresponds to device type 1, identifies a first set of applications={application 1, application 2, application 3} for which a WiFi network is to be used for communications on weekends (Saturday and Sunday), and identifies a second set of applications={application 4} for which a cellular network, e.g., a P-LTE network, is to be used for communications on weekends (Saturday and Sunday).

Configuration profile 3 1006, which corresponds to device type 2, identifies a first set of applications={application 5, application 5} for which a WiFi network is to be used for communications on weekdays (M-F) during the time range of 9:00 AM-5:00 PM, and identifies a second set of applications={application 3} for which a cellular network, e.g., a P-LTE network, is to be used for communications on weekdays (M-F) during the time range of 9:00 AM-5:00 PM.

Configuration profile 4 1008, which corresponds to device type 3, identifies a first set of applications={application 7, application 8} for which a WiFi network is to be used for at least one direction of communications on weekdays (M-F) during the time range of 9:00 AM-5:00 PM (with regard to application 7 the WiFi network is to be used for both uplink and downlink communications; with regard to application 8 the WiFi network is to be used for only downlink communications), and identifies a second set of applications={application 8, application 9} for which a cellular network, e.g., a P-LTE network, is to be used for at least one direction of communications on weekdays (M-F) during the time range of 9:00 AM-5:00 PM (with regard to application 8 the cellular network (e.g., P-LTE network) is to be used for only uplink communications; with regard to application 9 the cellular network (e.g., P-LTE network) is to be used for both downlink and uplink communications).

Configuration profile 5 1010, which corresponds to device type 4 (which supports a plurality of different alternative P-LTE access technologies/protocols, identifies a first set of applications={application 10, application 11} for which a WiFi network is to be used for communications on weekdays (M-F) during the time range of 9:00 AM-5:00 PM, identifies a second set of applications={application 12, application 13} for which a P-LTE network type 1 access alternative (using licensed spectrum), is to be used for communications on weekdays (M-F) during the time range of 9:00 AM-5:00 PM, identifies a third set of applications={application 14} for which a P-LTE network access alternative (using shared spectrum (e.g., CBRS)), is to be used for communications on weekdays (M-F) during the time range of 9:00 AM-5:00 PM, and identifies a fourth set of applications={application 15} for which a P-LTE network access alternative (using unlicensed spectrum), is to be used for communications on weekdays (M-F) during the time range of 9:00 AM-5:00 PM.

Configuration profile 6 1012, which corresponds to device type 5 (e.g., a sensor type of device, controllable device or controller device) identifies a first set of applications={application 16, application 17} for which a WiFi network is to be used for communications during any day or time, and identifies a second set of applications={application 18, application 18} for which a P-LTE network type 5 access alternative (using LTE-M), is to be used for communications on weekdays (M-F) during any day or time.

Various aspects, features and/or advantages of some embodiment of the present invention are further discussed below. P-LTE and WIFI both have their own benefits and could be used for specific applications; however, with existing approaches there is no way for end devices to automatically switch between both technologies depending on the use case and application need. The available solutions right now can switch between cellular and WIFI depending on coverage in terms signal strength not application needs.

Typically, a private LTE (P-LTE) network has wider coverage than a WIFI network, e.g., based on the access technologies deployed, spectrum utilized and corresponding specifications. A relatively larger size P-LTE network coverage range may, and sometimes does overlap with a plurality of smaller WiFi network coverage ranges. In enterprise setup an end device is, e.g., a rugged tablet, smart phone, laptop, camera, modem, or any kind of sensor. A typical end device will be able to attach to the P-LTE network and a WIFI network. In accordance with a feature of some embodiments, the end device is controlled to attach to the network (WiFi or P-LTE) which is expected to achieve the best quality of experience. In various embodiments, a control server selects which network (P-LTE or WiFi), e.g. on a per application basis, an end device should attach to based on reported KPIs and resource utilization information. The control server sends a communications profile (configuration profile) to the end device specifying which network (P-LTE or WiFi) the end device should attach to and use for each application being used by the end device, and optionally further based on UL/DL direction and/or date and TOD information. In some embodiments, the control server further selects a particular type of P-LTE access technology and/or bandwidth to be used, when multiple alternative are supported by the end device, and when P-LTE is selected over WiFi.

In some embodiments, the end device may also be able to attach to other types of access networks, e.g. a non-LTE based IoT access network or a non-LTE based LPWAN network, and the selection for an end device for a particular application may further include those options.

An end device may have different network needs depending on the application running on it. For example, a machine in the factory is using video to classify which products are defective and which are good, and this application needs low latency thus P-LTE is a good choice for this application, and P-LTE is selected by the control server to be used by the end device for the defect classification application and is communicated in a communications profile sent to the end device. Later, this same machine is used as a surveillance camera, and this requires high bandwidth thus WIFI is more appropriate for this application, and WiFi is selected by the control server to be used by the end device for the camera surveillance application and is communicated in a communications profile sent to the end device. Some other end devices may need high throughput on the uplink for video streaming and low latency on the downlink for edge decision and processing, and the control device may generate and send a profile which specifies using WiFi for uplink for a video streaming application and P-LTE for edge decision and processing for downlink.

In some embodiments, a Configuration Controller Server, e.g., within an edge computing network, on the edge of the P-LTE network, is operated to send, e.g. push, a configuration profile to any end device on the P-LTE network. In some embodiments, a configuration profile module, e.g., included in an end device will monitor the applications running on the end device for latency and throughput requirements and sends data back to the control server (e.g., configuration controller server) to make decisions accordingly on which access network to send traffic on. Configuration profiles for end devices will reside on a server, e.g. in or coupled to the P-LTE network, and an end device will have a configuration profile, e.g., a default configuration profile or a most recent configuration profile for the end device, downloaded once it joins the P-LTE network.

In some embodiments, P-LTE network admin can, and sometimes does, make changes to the configuration profile (s) (for one or more or all end devices) using the configuration controller server and push updates to one or more or all devices on the network.

Configuration profile modules send statistics from each of the end devices to the configuration controller server for analysis. Using Machine Learning regression algorithm, the analysis will determine each application's latency and throughput requirements. For example, the analysis data will include dropped packets, bit error rate, out of order packets, and other KPI's for each application on each access network along with average throughput and latency for the access network.

Correlating all this collected information will enhance the configuration profile in choosing the access network most suited for each application. This way the configuration profile will get better the more users use the end devices.

Furthermore, configuration profile can predict end devices behavior from their daily usage and make faster decision on which network they should join at what time of the day for example in an enterprise factory setup a sensor will probably do the same function every day. When the sensor or networks restarts the sensor will automatically know which network to join once connectivity is restored.

In some embodiments, the uplink and downlink traffic can be, and sometimes is, split according to the application needs, for example, uplink using WIFI and downlink using P-LTE or vice versa. The configuration profile on each device should be able to make this decision for optimal quality of service.

Various features in accordance with the present invention will enhance end user experience since the end device will be connected on the best access method for the application running on it. The enhanced user experience can be quantified in terms of less dropped packets, less buffering, higher quality of experience, and less customer complaint calls. The machine learning (ML) regression algorithms will predict end devices behavior and help better plan the P-LTE and WIFI networks in terms of adding capacity and optimizing parameters.

In some embodiments, a configuration controller server, e.g. on the P-LTE network, decides on devices' access method according to latency & throughput requirements.

In some embodiments, a configuration profile module is sent, e.g. pushed, to each device on P-LTE to monitor KPI's and report them back to the configuration controller.

In some embodiments, the configuration controller learns from devices' statistics and updates the configuration profiles.

In some embodiments, the configuration controller splits downlink & uplink traffic on different access networks (P-LTE & WIFI) for certain devices according to the applications requirements.

An example of time stamped data gathered from each end device and sent, e.g., in a report, to configuration controller server includes, e.g. on a per application basis: i) latency information, Bit Error Rate (BER) information, Packet Error Rate (PER) information, Throughput (DL/UL) information, Out-of-order packets information, and RF conditions' information (e.g., RSRP, RSSI, SINR, CQI).

In some embodiments, decisions of the configuration controller server (i.e. communicated in a communications (configuration) profile sent to end devices) includes: i) decisions as to the suitable access technology method for the device (e.g., WiFi or P-LTE) on a per application basis, and ii) decisions if needed, regarding splitting DL & UL traffic of a device between different access networks.

In some embodiments, the configuration controller server communicates with end devices and/or access networks (PLTE, WIFI, LPWAN, etc.) for setting QoS level if the access technology has QoS.

Numbered List of Exemplary Method Embodiments

Method Embodiment 1 A method of operating a configuration server (324) in a communications network (300), the method comprising: storing (512) configuration profiles (514) for one or more communications devices, said configuration profiles (514) including a first configuration profile (516) for a first device, said first configuration profile (516) indicating a first set of applications for which a WIFI network is to be used and a second set of applications for which a cellular (e.g., private-LTE (P-LTE)) network is to be used; receiving (524) a request for a configuration profile from the first communications device; and sending (528) a selected configuration profile (e.g., the first configuration profile) to the first communications device to control use of said cellular and said WIFI networks in accordance with the selected configuration profile.

Method Embodiment 1A The method of Method Embodiment 1, wherein the request for the configuration profile indicates the applications on the first communications device with which the configuration profile is to be used.

Method Embodiment 1B The method of Method Embodiment 1, further comprising: selecting (526) a configuration profile to send to the first device based on at least the applications on the first communications device with which the configuration profile is to be used.

Method Embodiment 1BA The method of Method Embodiment 1B, wherein the request for a configuration profile further includes information about the time of day or day of week the configuration profile is to be used.

Method Embodiment 1BAA The method of Method Embodiment 1B, wherein selecting (526) a configuration profile to send to the first device is further based on time of day or day of week the configuration profile is to be used.

Method Embodiment 1BAA The method of Method Embodiment 1BAA, wherein selecting (526) a configuration profile to send to the first device is further based on type of device which is to use the configuration profile (for example general purpose user devices or cell phones may be expected to support higher data rates while sensors or fixed appliances may have much lower data rates and/or processing capability).

Method Embodiment 1C The method of Method Embodiment 1B, wherein selecting (526) a configuration profile to send to the first device includes matching (e.g., using one or more trained models trained to match a set of inputs to a configuration profile) the set of applications (and/or other configuration profile request information) to one of the stored configuration profiles.

Method Embodiment 2 The method of Method Embodiment 1, wherein said first configuration profile lists: i) a first application for which the WIFI network is to be used for both uplink and downlink communications corresponding to the first application; ii) a second application for which the cellular network is to be used for both uplink and downlink communications; and iii) a third application for which the cellular network is to be used for one of the uplink or downlink communications and for which the WIFI network is to be used for the one of the uplink or downlink communications.

Method Embodiment 3 The method of Method Embodiment 2, further comprising: receiving (504) key performance information from the first communications device, said key performance information including key performance information on a per application basis for one or more communications applications running on said first communications device.

Method Embodiment 3A The method of Method Embodiment 3, wherein said key performance information includes at least two of: i) latency information, ii) bit error rate (BER) information, iii) packet error rate (PER) information, iv) uplink throughput, v) downlink throughput, vi) out-of-order packet information, and radio frequency (RF) condition information.

Method Embodiment 3B The method of Method Embodiment 3A, wherein said RF condition information includes: one or more of: a received signal received power (RSRP) value, a received signal strength indicator (RSSI) value, a signal to interference plus noise ratio (SINR) value, or iii) a channel quality indicator (CQI) value.

Method Embodiment 3C The method of Method Embodiment 3, wherein said key performance information includes at least four of: i) latency information, ii) bit error rate (BER) information, iii) packet error rate (PER) information, iv) uplink throughput, v) downlink throughput, vi) out-of-order packet information, and radio frequency (RF) condition information.

Method Embodiment 4 The method of Method Embodiment 3, further comprising: receiving (506) communications resource utilization information from said first communications device on a per application basis, said communications resource utilization information including uplink and/or downlink resource used on a per application basis for the one or more communications applications running on said first communications device.

Method Embodiment 5 The method of Method Embodiment 4, further comprising: analyzing (508) said key performance information and resource utilization information received from said first communications device to determine which of the WIFI or cellular network should be used on a per application basis given one or more combinations of applications running on said first communications device.

Method Embodiment 6 The method of Method Embodiment 5, wherein analyzing (508) said key performance information and resource utilization information received from said first communications device to determine which of the WIFI or cellular network should be used on a per application basis given one or more combinations of applications running on said first communications device includes performing (509) one or more artificial intelligence model training operations to generate models which map a set of applications running on said first device to a communication configuration to be used by said first communications device (wherein the configuration specifies for the applications running on the first communications device the network to be used for each application with, in some cases, separate network information being specified for uplink and downlink communications for one or more applications).

Method Embodiment 7 The method of Method Embodiment 1, wherein said cellular network is a private-LTE (P-LTE) network.

Method Embodiment 7A The method of Method Embodiment 1, wherein said P-LTE network includes a first type of P-LTE access device and a second type of P-LTE access device.

Method Embodiment 7B The method of Method Embodiment 7A, wherein first type of P-LTE access device uses licensed spectrum and said second type of P-LTE access device uses shared or unlicensed spectrum.

Method Embodiment 7C The method of Method Embodiment 7A, wherein first type of P-LTE access device is a small cell base station and said second type of P-LTE access device is one of: i) a CBRS base station or ii) a LTE-M gateway.

Numbered List of Exemplary Apparatus Embodiments

Apparatus Embodiment 1 A configuration server (324 or 600) in a communications network (300), the configuration server comprising: a receiver (624); a transmitter (626); and a processor (602) configured to: operate the configuration server (324 or 600) to store (512) (e.g., in memory 610) configuration profiles (514) for one or more communications devices, said configuration profiles (514) including a first configuration profile (516) for a first device, said first configuration profile (516) indicating a first set of applications for which a WIFI network is to be used and a second set of applications for which a cellular (e.g., private-LTE (P-LTE)) network is to be used; operate the receiver (624) to receive (524) a request for a configuration profile from the first communications device; and operate the transmitter (626) to send (528) a selected configuration profile (e.g., the first configuration profile) to the first communications device to control use of said cellular and said WIFI networks in accordance with the selected configuration profile.

Apparatus Embodiment 1A The configuration server (324 or 600) of Apparatus Embodiment 1, wherein the request for the configuration profile indicates the applications on the first communications device with which the configuration profile is to be used.

Apparatus Embodiment 1B The configuration server (324 or 600) of Apparatus Embodiment 1, wherein said processor (602) is further configured to: select (526) a configuration profile to send to the first device based on at least the applications on the first communications device with which the configuration profile is to be used.

Apparatus Embodiment 1BA The configuration server (324 or 600) of Apparatus Embodiment 1B, wherein the request for a configuration profile further includes information about the time of day or day of week the configuration profile is to be used.

Apparatus Embodiment 1BAA The configuration server (324 or 600) of Apparatus Embodiment 1B, wherein selecting (526) a configuration profile to send to the first device is further based on time of day or day of week the configuration profile is to be used.

Apparatus Embodiment 1BAA The configuration server (324 or 600) of Apparatus Embodiment 1BAA, wherein selecting (526) a configuration profile to send to the first device is further based on type of device which is to use the configuration profile (for example general purpose user devices or cell phones may be expected to support higher data rates while sensors or fixed appliances may have much lower data rates and/or processing capability).

Apparatus Embodiment 1C The configuration server (324 or 600) of Apparatus Embodiment 1B, wherein selecting (526) a configuration profile to send to the first device includes matching (e.g., using one or more trained models trained to match a set of inputs to a configuration profile) the set of applications (and/or other configuration profile request information) to one of the stored configuration profiles.

Apparatus Embodiment 2 The configuration server (324 or 600) of Apparatus Embodiment 1, wherein said first configuration profile lists: i) a first application for which the WIFI network is to be used for both uplink and downlink communications corresponding to the first application; ii) a second application for which the cellular network is to be used for both uplink and downlink communications; and iii) a third application for which the cellular network is to be used for one of the uplink or downlink communications and for which the WIFI network is to be used for the one of the uplink or downlink communications.

Apparatus Embodiment 3 The configuration server (324 or 600) of Apparatus Embodiment 2, wherein said processor is further configured to: operate said receiver (624) to receive (504) key performance information from the first communications device, said key performance information including key performance information on a per application basis for one or more communications applications running on said first communications device.

Apparatus Embodiment 3A. The configuration server (324 or 600) of Apparatus Embodiment 3, wherein said key performance information includes at least two of: i) latency information, ii) bit error rate (BER) information, iii) packet error rate (PER) information, iv) uplink throughput, v) downlink throughput, vi) out-of-order packet information, and radio frequency (RF) condition information.

Apparatus Embodiment 3B. The configuration server (324 or 600) of Apparatus Embodiment 3A, wherein said RF condition information includes: one or more of: a received signal received power (RSRP) value, a received signal strength indicator (RSSI) value, a signal to interference plus noise ratio (SINR) value, or iii) a channel quality indicator (CQI) value.

Apparatus Embodiment 3C The configuration server (324 or 600) of Apparatus Embodiment 3, wherein said key performance information includes at least four of: i) latency information, ii) bit error rate (BER) information, iii) packet error rate (PER) information, iv) uplink throughput, v) downlink throughput, vi) out-of-order packet information, and radio frequency (RF) condition information.

Apparatus Embodiment 4 The configuration server (324 or 600) of Apparatus Embodiment 3, wherein said processor is further configured to: operate the receiver (624) to receive (506) communications resource utilization information from said first communications device on a per application basis, said communications resource utilization information including uplink and/or downlink resource used on a per application basis for the one or more communications applications running on said first communications device.

Apparatus Embodiment 5 The configuration server (324 or 600) of Apparatus Embodiment 4, wherein said processor is further configured to: analyze (508) said key performance information and resource utilization information received from said first communications device to determine which of the WIFI or cellular network should be used on a per application basis given one or more combinations of applications running on said first communications device.

Apparatus Embodiment 6 The configuration server (324 or 600) of Apparatus Embodiment 5, wherein said processor is configured to: perform (509) one or more artificial intelligence model training operations to generate models which map a set of applications running on said first device to a communication configuration to be used by said first communications device (wherein the configuration specifies for the applications running on the first communications device the network to be used for each application with, in some cases, separate network information being specified for uplink and downlink communications for one or more applications), as part of being configured to analyze (508) said key performance information and resource utilization information received from said first communications device to determine which of the WIFI or cellular network should be used on a per application basis given one or more combinations of applications running on said first communications device includes.

Apparatus Embodiment 7 The configuration server (324 or 600) of Apparatus Embodiment 1, wherein said cellular network is a private-LTE (P-LTE) network (303).

Apparatus Embodiment 7A The configuration server (324 or 600) of Apparatus Embodiment 1, wherein said P-LTE network (303) includes at least a first type of P-LTE access device and a second type of P-LTE access device.

Apparatus Embodiment 7B The configuration server (324 or 600) 600) of Apparatus Embodiment 7A, wherein first type of P-LTE access device (302) uses licensed spectrum and said second type of P-LTE access device (304 or 306 or 308) uses shared or unlicensed spectrum.

Apparatus Embodiment 7C The configuration server (324 or 600) of Apparatus Embodiment 7A, wherein first type of P-LTE access device is a small cell base station (302) and said second type of P-LTE access device is one of: i) a CBRS base station (304) or ii) a LTE-M gateway (306).

Numbered List of Non-Transitory Computer Readable Medium Embodiments

Non-Transitory Computer Readable Medium Embodiment 1 A non-transitory computer readable medium (610) including computer executable instructions which when executed by a processor (602) of a configuration server (324 or 600) cause the configuration server (324 or 600) to perform the steps of: storing (512) configuration profiles (514) for one or more communications devices, said configuration profiles (514) including a first configuration profile (516) for a first device, said first configuration profile (516) indicating a first set of applications for which a WIFI network is to be used and a second set of applications for which a cellular (e.g., private-LTE (P-LTE)) network is to be used; receiving (524) a request for a configuration profile from the first communications device; and sending (528) a selected configuration profile (e.g., the first configuration profile) to the first communications device to control use of said cellular and said WIFI networks in accordance with the selected configuration profile.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g. a control server, a configuration server, application server (AS), a network server, a gateway such as an IoT gateway, a LTE-M gateway, an end device, e.g., a user device such as, e.g., a smart phone, tablet device, etc., a sensor device, a camera device, an end device which performs control operations, an end device which is a controllable device, an End Point (EP) device such as a LTE-M EP device or an EP IoT device, e.g. a LTE-M EP IoT sensor device or EP IoT sensor or application device, a user device such as a user equipment (UE) device, base stations, e.g. a cellular base station supporting communications in licensed spectrum, shared spectrum, and/or unlicensed spectrum, cellular base station supporting NB-IoT (macro cell base station or small cell base station) such as a eNB or gNB or ng-eNB, non-cellular access points, e.g. WiFi APs, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., said device including a processor configured to implement one, multiple or all of the steps of one or more methods of the invention.

In some embodiments, the processor or processors, e.g., CPUs, of one or more devices, e.g., a control server such as a configuration server, a control server, application server (AS), network server, gateway such as a LTE-M gateway or IoT gateway, End Point (EP) device such as LTE-M EP device or a EP IoT device, e.g. LTE-M EP IoT sensor ore application, EP IoT sensor or application device, user device such as a user equipment (UE) device, base stations, e.g. cellular base station supporting communications in licensed spectrum, shared spectrum and/or unlicensed spectrum, cellular base station supporting NB-IoT (macro cell base station or small cell base station) such as a eNB or gNB or ng-eNB, non-cellular network access points, e.g., WiFi APs, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a control server, configuration server, control server such as application server (AS), network server, gateway such as an IoT gateway, End Point (EP) device such as EP IoT device, e.g. EP IoT sensor or application device, user device such as a user equipment (UE) device, base stations, e.g. a cellular base station using licensed, shared and/or unlicensed spectrum, cellular base station supporting NB-IoT (macro cell base station or small cell base station) such as a eNB or gNB or ng-eNB, WiFi access points, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., includes a component corresponding to each of one or more of the steps of the various described methods performed by the device in which the processor is included. In some but not all embodiments a device, e.g., a control server such as configuration server, application server (AS), network server, gateway such as IoT gateway, a LTE-M gateway, UE devices, End Point (EP) device such as EP IoT device, e.g. EP IoT sensor or application device, user device such as a user equipment (UE) device, base stations, e.g. cellular base stations supporting licensed, shared and/or unlicensed spectrum, cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as control server such as a configuration server, an application server (AS), network server, gateway such as IoT gateway, LTE-M gateway, end devices such as UEs, sensor devices, control end devices, etc. End Point (EP) device such as EP IoT device, e.g. EP IoT sensor or application devices, user device such as a user equipment (UE) device, base stations, e.g. cellular base station supporting licensed, shared and/or unlicensed spectrum communications, cellular base station supporting NB-IoT (macro cell base station or small cell base station) such as a eNB or gNB or ng-eNB, access points such as WiFi APs, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Various embodiments are directed to cellular networks, e.g. private LTE-networks and WiFi networks. In some embodiments, a cellular network, e.g., a private LTE-network, supports a plurality of different alternative technologies, communications bands and/or protocols. In various embodiments, end devices, e.g. user devices and/or sensor devices support communications with one or more different types of access nodes of the cellular network and supports communications with WiFi access points of one or more WiFi networks. In various embodiments, the cellular network coverage and the WiFi network coverage is at least partially overalappin.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a configuration server in a communications network, the method comprising:
   storing configuration profiles for one or more different types of communications devices, said configuration profiles including a first configuration profile indicating a first set of applications for which a WIFI network is to be used and a second set of applications for which a cellular network is to be used;
   receiving a request for a configuration profile from a first communications device; and
   sending a selected configuration profile to the first communications device to control use of said cellular and said WIFI networks in accordance with the selected configuration profile, said selected configuration profile being one of the stored configuration profiles.

2. The method of claim 1, further comprising:
   selecting a configuration profile to send to the first communications device based on at least applications on the first communications device with which the configuration profile is to be used.

3. The method of claim 2, wherein selecting a configuration profile to send to the first communications device is further based on time of day or day of week the configuration profile is to be used.

4. The method of claim 3, wherein selecting a configuration profile to send to the first communications device is further based on a device type of the first communications device.

5. The method of claim 2, wherein selecting a configuration profile to send to the first communications device includes matching a set of applications to one of the stored configuration profiles.

6. The method of claim 2,
   wherein storing configuration profiles includes storing multiple different configuration profiles in memory; and
   wherein selecting the configuration profile to send to the first device includes selecting the configuration profile to send to the first device from a plurality of different configuration profiles which were stored in memory prior to receiving the request for the configuration profile from the first communications device.

7. The method of claim 6, wherein one or more of the stored configuration profiles include device type information.

8. The method of claim 7, wherein different stored configuration profiles associated different sets of applications with WiFi communications.

9. The method of claim 8, wherein said first configuration profile includes different day to be used information than a second stored configuration profile.

10. The method of claim 2, wherein the received request for the configuration profile includes applications for which the requested configuration profile is to be used, a device type with which the requested configuration profile is to be used and a time indicating when the requested configuration profile is to be used.

11. The method of claim 10, further comprising:
    storing in said memory models that map configuration request related information to a profile to be returned.

12. The method of claim 11, wherein selecting the configuration profile to send to the first communications device includes using a stored model and information included with the request for a configuration profile to select which one of the stored configuration profiles to send to the first communications device.

13. The method of claim 1, wherein said first configuration profile lists: i) a first application for which the WIFI network is to be used for both uplink and downlink communications corresponding to the first application; ii) a second application for which the cellular network is to be used for both uplink and downlink communications; and iii) a third application for which the cellular network is to be used for one of the uplink or downlink communications and for which the WIFI network is to be used for one of the uplink or downlink communications.

14. The method of claim 13, further comprising:
    receiving key performance information from the first communications device, said key performance information including key performance information on a per application basis for one or more communications applications running on said first communications device.

15. The method of claim 14, wherein said key performance information includes at least two of: i) latency information, ii) bit error rate (BER) information, iii) packet error rate (PER) information, iv) uplink throughput, v) downlink throughput, vi) out-of-order packet information, and radio frequency (RF) condition information.

16. The method of claim 14, further comprising:
receiving communications resource utilization information from said first communications device on a per application basis, said communications resource utilization information including uplink and/or downlink resource used on a per application basis for the one or more communications applications running on said first communications device.

17. The method of claim 16, further comprising:
analyzing said key performance information and resource utilization information received from said first communications device to determine which of the WIFI or cellular network should be used on a per application basis given one or more combinations of applications running on said first communications device.

18. The method of claim 17, wherein analyzing said key performance information and resource utilization information received from said first communications device to determine which of the WIFI or cellular network should be used on a per application basis given one or more combinations of applications running on said first communications device includes performing one or more artificial intelligence model training operations to generate models which map a set of applications running on said first device to a communication configuration to be used by said first communications device.

19. The method of claim 1, wherein said cellular network is a private-LTE (P-LTE) network.

20. A configuration server in a communications network, the configuration server comprising:
a receiver;
a transmitter; and
a processor configured to:
operate the configuration server to store configuration profiles for one or more different types of communications devices, said configuration profiles including a first configuration profile indicating a first set of applications for which a WIFI network is to be used and a second set of applications for which a cellular network is to be used;
select a configuration profile, from the stored configuration profiles, to send to the first communications device based on at least applications on the first communications device with which the configuration profile is to be used, said selected configuration profile being one of the stored configuration profiles;
operate the receiver to receive a request for a configuration profile from a first communications device; and
operate the transmitter to send the selected configuration profile to the first communications device to control use of said cellular and said WIFI networks in accordance with the selected configuration profile.

21. The configuration server of claim 20, wherein said first configuration profile lists: i) a first application for which the WIFI network is to be used for both uplink and downlink communications corresponding to the first application; ii) a second application for which the cellular network is to be used for both uplink and downlink communications; and iii) a third application for which the cellular network is to be used for one of the uplink or downlink communications and for which the WIFI network is to be used for one of the uplink or downlink communications.

22. The configuration server of claim 21, wherein said processor is further configured to:
operate said receiver to receive key performance information from the first communications device, said key performance information including key performance information on a per application basis for one or more communications applications running on said first communications device.

23. The configuration server of claim 22, wherein said processor is further configured to:
operate the receiver to receive communications resource utilization information from said first communications device on a per application basis, said communications resource utilization information including uplink and/or downlink resource used on a per application basis for the one or more communications applications running on said first communications device.

24. The configuration server of claim 23, wherein said processor is further configured to:
analyze said key performance information and resource utilization information received from said first communications device to determine which of the WIFI or cellular network should be used on a per application basis given one or more combinations of applications running on said first communications device.

25. The configuration server of claim 24, wherein said processor is configured to:
perform one or more artificial intelligence model training operations to generate models which map a set of applications running on said first device to a communication configuration to be used by said first communications device, as part of being configured to analyze said key performance information and resource utilization information received from said first communications device to determine which of the WIFI or cellular network should be used on a per application basis given one or more combinations of applications running on said first communications device.

26. The configuration server of claim 20, wherein said cellular network is a private-LTE (P-LTE) network.

27. A non-transitory computer readable medium including computer executable instructions which when executed by a processor of a configuration server cause the configuration server to perform the steps of:
storing configuration profiles for one or more different types of communications devices, said configuration profiles including a first configuration profile indicating a first set of applications for which a WIFI network is to be used and a second set of applications for which a cellular network is to be used;
receiving a request for a configuration profile from the first communications device;
selecting a configuration profile, from the stored configuration profiles, to send to the first communications device based on at least applications on the first communications device with which the configuration profile is to be used, said selected configuration profile being one of the stored configuration profiles; and
sending a selected configuration profile to the first communications device to control use of said cellular and said WIFI networks in accordance with the selected configuration profile.

* * * * *